(12) United States Patent
Takayasu et al.

(10) Patent No.: US 11,946,906 B2
(45) Date of Patent: Apr. 2, 2024

(54) DAMAGED REGION DETERMINATION SYSTEM, DETERMINATION APPARATUS AND DAMAGED REGION DETERMINATION METHOD

(71) Applicant: Kabushiki Kaisha Toshiba, Tokyo (JP)

(72) Inventors: Toshiki Takayasu, Kawasaki (JP); Takashi Usui, Saitama (JP); Kazuo Watabe, Yokohama (JP); Atsuro Oonishi, Kawasaki (JP); Hiroshi Takahashi, Yokohama (JP); Takamitsu Sunaoshi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 78 days.

(21) Appl. No.: 17/653,493

(22) Filed: Mar. 4, 2022

(65) Prior Publication Data

US 2022/0334082 A1    Oct. 20, 2022

(30) Foreign Application Priority Data

Apr. 19, 2021 (JP) ................................. 2021-070431

(51) Int. Cl.
*G01N 29/04* (2006.01)
*B61K 9/08* (2006.01)
*B61L 23/04* (2006.01)

(52) U.S. Cl.
CPC .............. *G01N 29/043* (2013.01); *B61K 9/08* (2013.01); *B61L 23/041* (2013.01); *B61L 23/044* (2013.01); *G01N 2291/0289* (2013.01)

(58) Field of Classification Search
CPC ......... G01N 29/043; G01N 2291/0289; B61K 9/08; B61L 23/041; B61L 23/044
USPC .......................................................... 701/19
See application file for complete search history.

(56) References Cited

U.S. PATENT DOCUMENTS

2019/0232988 A1* 8/2019 Lang ........................ G01H 1/00

FOREIGN PATENT DOCUMENTS

| JP | 2002-286700 A | 10/2002 | |
|---|---|---|---|
| JP | 2006-220569 A | 8/2006 | |
| JP | 2006-258494 A | 9/2006 | |
| JP | 2012-158919 A | 8/2012 | |
| JP | 2014-080133 A | 5/2014 | |
| WO | WO-2019136321 A9 * | 8/2019 | ............... G01H 1/00 |
| WO | WO 2020/054026 A1 | 3/2020 | |

* cited by examiner

*Primary Examiner* — Mahmoud Gimie
(74) *Attorney, Agent, or Firm* — Oblon, McClelland, Maier & Neustadt, L.L.P.

(57) ABSTRACT

According to one embodiment, a damaged region determination system of the embodiment includes a plurality of sensors, a position locator, and a determiner. The plurality of sensors detects elastic waves generated in a target object related to a railway which is a determination target of a damaged region. The position locator locates positions of sources of a plurality of elastic waves based on the plurality of elastic waves detected by each of the plurality of sensors. The determiner determines the damaged region in the target object based on the positions of the sources of the plurality of elastic waves.

14 Claims, 15 Drawing Sheets

DAMAGED REGION DETERMINATION SYSTEM, DETERMINATION APPARATUS AND DAMAGED REGION DETERMINATION METHOD

CROSS-REFERENCE TO RELATED APPLICATION

This application is based upon and claims the benefit of priority from Japanese Patent Application No. 2021-070431, filed Apr. 19, 2021; the entire contents of which are incorporated herein by reference.

FIELD

Embodiments described herein relate generally to a damaged region determination system, a determination apparatus, and a damaged region determination method.

BACKGROUND

Conventionally, railroad transportation problems have occurred due to rail abnormalities. Among rail abnormalities, rail breakage has a high risk of causing serious accidents such as derailment, so immediate measures therefor are required. A technique for detecting rail breakage has also been proposed, but since the conventional method detects rail breakage, it can be assumed that rails have already been damaged.

If an abnormality can be detected at an early stage of damage, it can be expected that more effective countermeasures will be able to be taken, which is desirable from the viewpoint of preventing serious accidents. Conventional techniques that can detect abnormalities in the early stages of damage have also been proposed. However, with the conventional method, there are cases where an abnormality cannot be detected, or it is necessary to install a large number of sensors in order to detect an abnormality, and it may not be possible to easily determine the area of damage. It should be noted that such a problem occurs not only in rails but also in overhead lines and the like.

DETAILED DESCRIPTION

The present invention provides a problem to be solved by the present invention is to provide a damaged region determination system, a determination apparatus, and a damaged region determination method that allow determination of a damaged region of an object related to a railway before a breakage occurs.

According to one embodiment, a damaged region determination system of the embodiment includes a plurality of sensors, a position locator, and a determiner. The plurality of sensors detects elastic waves generated in a target object related to a railway which is a target for determination of a damaged region. The position locator locates positions of sources of a plurality of elastic waves based on the plurality of elastic waves detected by each of the plurality of sensors. The determiner determines the damaged region in the target object based on the positions of the sources of the plurality of elastic waves.

Hereinafter, the damaged region determination system, the determination apparatus, and the damaged region determination method of the embodiment will be described with reference to the drawings.

(Overview)

The damaged region determination system in the embodiment determines a damaged region in a rail based on elastic waves generated in the rail. A rail is, for example, a rail on which a railway vehicle travels. The phenomenon that elastic waves are generated in rails is caused by the leakage of current flowing through the rails to cause electrolytic corrosion, as shown in FIG. 1, for example.

Figure 1:
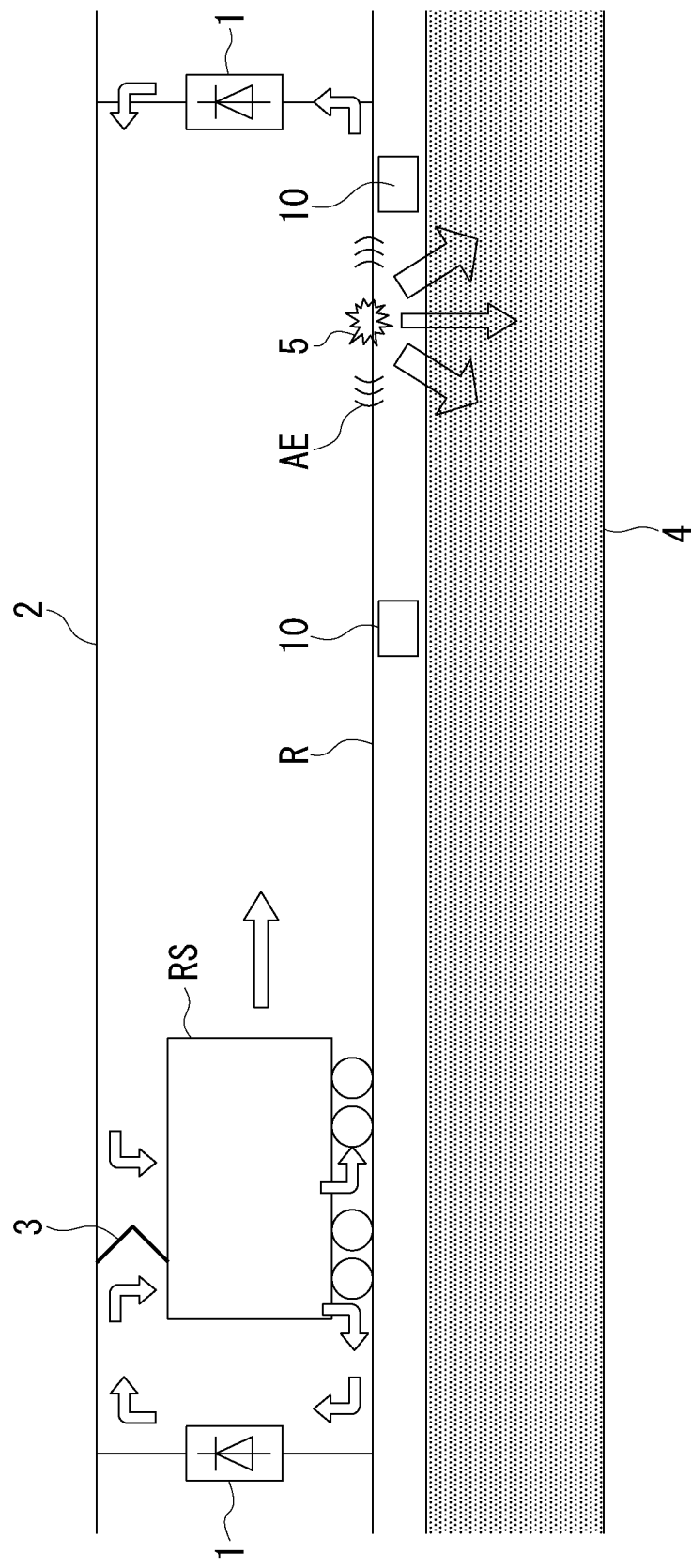
FIG. 1 is a diagram for explaining an overview of a damaged region determination system according to an embodiment.

FIG. 1 is a diagram for explaining an overview of the damaged region determination system according to an embodiment. FIG. 1 shows a state in which the railway vehicle RS is traveling on the rail R. The railway vehicle RS travels using the current supplied from a substation 1. More specifically, the current output from the substation 1 is supplied to the railway vehicle RS via a railway track 2 and a pantograph 3 included in the railway vehicle RS. The current not used in the railway vehicle RS returns to the substation 1 via the rail R. When the current returns to the substation 1 via the rail R, a portion of the current flows to the ground 4 as a leakage current. Due to such a phenomenon, electrolytic corrosion occurs on the rail R. In FIG. 1, a portion where electrolytic corrosion occurs is shown as an electrolytic corrosion portion 5.

An elastic wave AE is generated in the electrolytic corrosion portion 5. The elastic wave AE generated in the electrolytic corrosion portion 5 propagates inside the rail R. Therefore, in the damaged region determination system of the embodiment, a plurality of sensors 10 are installed on the rail R or an object in contact with the rail R, and the elastic wave AE propagating inside the rail R is detected by the plurality of sensors 10. The object in contact with the rail R is, for example, a rail clip for fixing the rail R to the sleepers, a wheel of the railway vehicle RS, or the like. In the damaged region determination system, position locating is performed based on the elastic wave AE detected by each of the plurality of sensors 10. As a result, the source of elastic wave AE (hereinafter referred to as "elastic wave source") is located. Then, in the damaged region determination system, the damaged region on the rail R is determined using the result of the position locating. The damaged region is an area where damage has been generated in the rail R due to electrolytic corrosion.

By determining the damaged region by the above-described method, it is possible to detect an abnormality in the rail before the rail breaks as in the conventional case.

Hereinafter, the details of the damaged region determination system of the embodiment will be described.

First Embodiment

Figure 2:
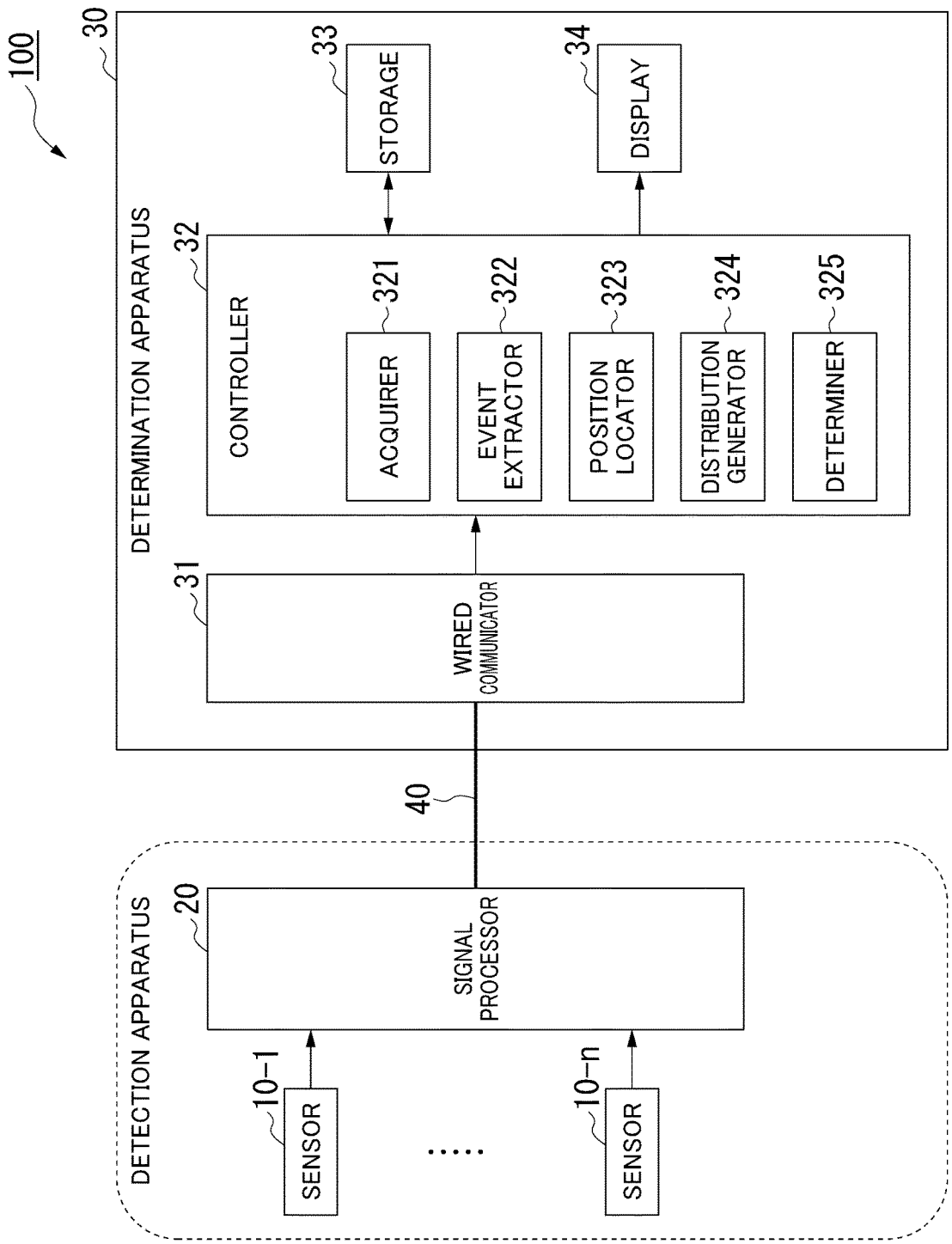
FIG. 2 is a diagram showing a configuration of a damaged region determination system according to a first embodiment.

FIG. 2 is a diagram showing the configuration of a damaged region determination system 100 according to the first embodiment. The damaged region determination system 100 includes a plurality of sensors 10-1 to 10-n (n is an integer of 1 or more), a signal processor 20, and a determination apparatus 30. In the first embodiment, the sensor 10 and the signal processor 20, and the signal processor 20 and the determination apparatus 30 are connected by wire. In the following description, when the sensors 10-1 to 10-n are not distinguished, they will be described as the sensor 10. In the first embodiment, the sensor 10 and the signal processor 20 are configured as a detection device for detecting elastic waves generated in the rail.

The sensor 10 is installed on the rail R or an object in contact with the rail R. In the following description, it is assumed that the sensor 10 is installed on the rail R. The signal processor 20 and the determination apparatus 30 may be provided at the same place as the sensor 10, or may be provided at a place different from the place where the sensor 10 is installed (for example, a management place where an administrator is located).

The sensor 10 detects elastic waves generated in the rail on which the railway vehicle RS travels. The sensor 10 converts the detected elastic wave into an electrical signal. For the sensor 10, for example, a piezoelectric element having sensitivity in the range of 10 kHz to 1 MHz is used. A more suitable sensor 10 is a piezoelectric element having sensitivity in the range of 100 kHz to 200 kHz. The sensor 10 comes in various types such as a resonance type having a resonance peak within a frequency range and a wide band type in which resonance is suppressed, but the type of the sensor 10 is not particularly limited. The method for detecting the elastic waves with the sensor 10 includes use of a voltage output type, a resistance change type, a capacitance type, and the like, but any detection method may be used. The sensor 10 may include an amplifier.

An accelerometer or a microphone may be used instead of the sensor 10. In this case, the accelerometer detects elastic waves generated inside the rail R. Then, the accelerometer converts the detected elastic wave into an electric signal by performing the same processing as the sensor 10.

The signal processor 20 receives the electric signal output from the sensor 10 as its input. The signal processor 20 performs signal processing on the input electric signal. The signal processing performed by the signal processor 20 is, for example, noise removal, determination of arrival time, parameter extraction, and the like. The signal processor 20 outputs the data of a feature value of the elastic wave obtained by the signal processing as transmission data to the determination apparatus 30 via a wired cable 40.

The signal processor 20 is configured using an analog circuit or a digital circuit. The digital circuit is realized by, for example, a field programmable gate array (FPGA) or a microcomputer. Using a non-volatile FPGA, power consumption during standby can be reduced. The digital circuit may be realized by a dedicated large-scale integration (LSI). The signal processor 20 may be equipped with a non-volatile memory such as a flash memory or a removable memory.

Figure 3:
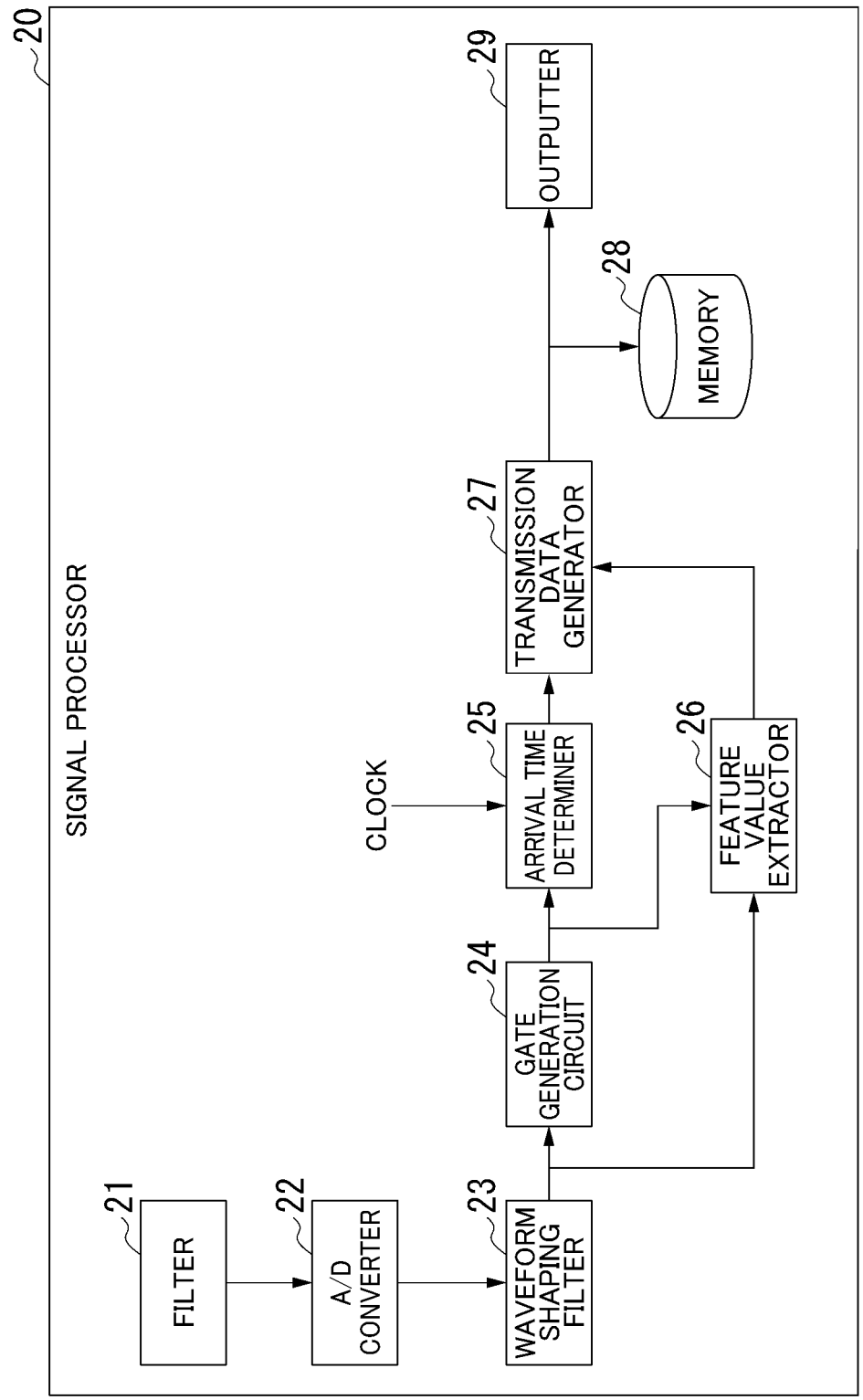
FIG. 3 is a schematic block diagram showing the functions of a signal processor according to the first embodiment.

FIG. 3 is a schematic block diagram showing the functions of the signal processor 20 in the first embodiment. The signal processor 20 includes a filter 21, an A/D converter 22, a waveform shaping filter 23, a gate generation circuit 24, an arrival time determiner 25, a feature value extractor 26, a transmission data generator 27, a memory 28, and an outputter 29.

The filter 21 removes noise components outside a signal band in the electric signal output from the sensor 10. The filter 21 is, for example, a band-pass filter (BPF).

The A/D converter 22 quantizes an electric signal from which noise components have been removed and converts it into a digital signal. The A/D converter 22 outputs the digital signal to the waveform shaping filter 23.

The waveform shaping filter 23 removes noise components outside a predetermined signal band from the digital signal of the input time-series data. The waveform shaping filter 23 is, for example, a band-pass filter (BPF). It may be assumed that the waveform shaping filter 23 is set to pass the same frequency band as the filter 21, for example. The waveform shaping filter 23 outputs a signal after noise component removal (hereinafter referred to as "noise-reduced signal") to the gate generation circuit 24 and the feature value extractor 26.

The gate generation circuit 24 receives the noise-reduced signal output from the waveform shaping filter 23 as its input. The gate generation circuit 24 generates a gate signal based on the input noise-reduced signal. The gate signal is a signal indicating whether or not the waveform of the noise-reduced signal is sustained.

The gate generation circuit 24 is realized by, for example, an envelope detector and a comparator. The envelope detector detects the envelope of the noise-reduced signal. The envelope is extracted, for example, by squaring a noise-reduced signal and performing a predetermined process (for example, a process using a low-pass filter or a Hilbert transform) on the squared output value. The comparator determines whether or not the envelope of the noise-reduced signal is equal to or greater than a predetermined threshold value.

When the envelope of the noise-reduced signal becomes equal to or greater than a predetermined threshold value, the gate generation circuit 24 outputs a first gate signal indicating that the waveform of the noise-reduced signal is sustained to the arrival time determiner 25 and the feature value extractor 26. On the other hand, when the envelope of the noise-reduced signal becomes less than the predetermined threshold value, the gate generation circuit 24 outputs a second gate signal indicating that the waveform of the noise-reduced signal is not sustained to the arrival time determiner 25 and the feature value extractor 26.

The arrival time determiner 25 receives a clock signal output from a clock source such as a crystal oscillator (not shown) and the gate signal output from the gate generation circuit 24 as its input. The arrival time determiner 25 determines an elastic wave arrival time using the clock input while the first gate signal is being input. The arrival time determiner 25 outputs the determined elastic wave arrival time as time information to the transmission data generator 27. The arrival time determiner 25 does not perform processing while the second gate signal is being input. The arrival time determiner 25 generates cumulative time information from the time when the power is turned on, based on the signal from the clock source. Specifically, the arrival time determiner 25 may be a counter that counts the edges of the clock, and the value of the register of the counter may be used as the time information. The register of the counter is determined to have a predetermined bit length.

The feature value extractor 26 receives the noise-reduced signal output from the waveform shaping filter 23 and the gate signal output from the gate generation circuit 24 as its input. The feature value extractor 26 extracts the feature value of the noise-reduced signal using the noise-reduced signal input while the first gate signal is being input. The feature value extractor 26 does not perform processing while the second gate signal is being input. The feature value is information indicating the feature of the noise-reduced signal.

The feature value includes, for example, the amplitude of the waveform [mV], the rise time of the waveform [usec], the duration of the gate signal [usec], the zero-crossing count number [times], and the energy of the waveform [arb.], the frequency [Hz], the RMS (Root Mean Square) value, and the like. The feature value extractor 26 outputs parameters related to the extracted feature value to the transmission data generator 27. When the feature value extractor 26 outputs the parameters related to the feature value, the sensor ID is associated with the parameters related to the feature value. The sensor ID represents identification information for identifying the sensor 10 installed on the rail R. In this way, it is possible to identify the sensor 10 that detected the elastic wave of which the feature value corresponds to the parameter.

The amplitude of the waveform is, for example, the value of the maximum amplitude in the noise-reduced signal. The rising edge time of the waveform is, for example, the time from the start of the rising edge of the gate signal to the time when the noise-reduced signal reaches the maximum value. The duration of the gate signal is, for example, the time from the start of the rising edge of the gate signal to the time when the amplitude becomes smaller than a preset value. The zero-crossing count number is, for example, the number of times the noise-reduced signal crosses a reference line passing through the zero value.

The energy of the waveform is, for example, a value obtained by time-integrating the square of the amplitude of the noise-reduced signal at each of time points. The definition of energy is not limited to the above-described example, and may be approximated using, for example, a waveform envelope. The frequency is the frequency of the noise-reduced signal. The RMS value is, for example, a value obtained by taking the square root of the squares of the amplitude of the noise-reduced signal at each of time points.

The transmission data generator 27 receives sensor IDs, time information, and parameters related to feature values as its input. The transmission data generator 27 generates transmission data including the input sensor ID, time information, and parameters related to the feature value. The transmission data generator 27 may record the generated transmission data in the memory 28, or may output the generated transmission data to the outputter 29 without recording it in the memory 28.

The memory 28 stores transmission data. The memory 28 is, for example, a dual port random access memory (RAM).

The outputter 29 sequentially outputs the transmission data stored in the memory 28 or the transmission data output from the transmission data generator 27 to the determination apparatus 30.

The explanation will be continued by returning to FIG. 2.

The determination apparatus 30 includes a wired communicator 31, a controller 32, a storage 33, and a display 34.

The wired communicator 31 receives the transmission data output from the signal processor 20 via the wired cable 40. The wired communicator 31 outputs the received transmission data to the controller 32.

The controller 32 controls the entire determination apparatus 30. The controller 32 is configured using a processor such as a central processing unit (CPU) and a memory. By executing the program, the controller 32 functions as an acquirer 321, an event extractor 322, a position locator 323, a distribution generator 324, and a determiner 325.

Some or all of the functional units of the acquirer 321, the event extractor 322, the position locator 323, the distribution generator 324, and the determiner 325 may be realized by hardware (circuit unit; including circuitry) such as an application specific integrated circuit (ASIC), a programmable logic device (PLD), or an FPGA, or may be realized by the cooperation of software and hardware. The program may be recorded on a computer-readable recording medium. The computer-readable recording medium may be, for example, a portable medium such as a flexible disk, a magneto-optical disk, a ROM or a CD-ROM, or a non-temporary storage medium such as a storage device such as a hard disk built into a computer system. The program may be transmitted over a telecommunication line.

The functions of the acquirer 321, the event extractor 322, the position locator 323, the distribution generator 324, and the determiner 325 need not have been installed in the determination apparatus 30 in advance, and may be realized by installing an additional application program in the determination apparatus 30.

The acquirer 321 acquires various types of information. For example, the acquirer 321 acquires the transmission data received by the wired communicator 31. The acquirer 321 stores the acquired transmission data in the storage 33.

The event extractor 322 extracts the transmission data in one event from the transmission data stored in the storage 33. The event represents an elastic wave occurrence event occurring in the rail R. The elastic wave occurrence event in the present embodiment is, for example, electrolytic corrosion occurring in the rail R. When one event occurs, elastic waves are detected by the plurality of sensors 10 at substantially the same time. That is, the storage 33 stores transmission data related to elastic waves detected at substantially the same time. Therefore, the event extractor 322 sets a predetermined time window, and extracts all pieces of transmission data whose arrival time is within the range of the time window as transmission data in one event. The event extractor 322 outputs the extracted transmission data in one event to the position locator 323.

The range Tw of the time window may be determined so as to be in the range of Tw≥dmax/v using the elastic wave propagation velocity v in the target rail R and the maximum sensor interval dmax. In order to avoid erroneous detection, it is desirable to set Tw to a value as small as possible, so that it may be set to be substantially Tw=dmax/v. The elastic wave propagation velocity v may be obtained in advance.

The position locator 323 locates the position of the elastic wave source based on the sensor position information and the sensor ID and time information included in each of the plurality of pieces of transmission data extracted by the event extractor 322. As the elastic wave, for example, data having an amplitude or energy of a predetermined value or less may be removed.

The sensor position information includes information regarding the installation position of the sensor 10 in association with the sensor ID. The sensor position information includes information such as, for example, horizontal and vertical distances from a specific position of the rail R. The position locator 323 has the sensor position information stored therein in advance. The sensor position information may be stored in the position locator 323 at any timing before the position locator 323 locates the position of the elastic wave source.

The sensor position information may be stored in the storage 33. In this case, the position locator 323 acquires the sensor position information from the storage 33 at the timing of performing the position locating. A Kalman filter, a least-squares method, or the like may be used to locate the position of the elastic wave source. The position locator 323 outputs the position information of the elastic wave source obtained during the measurement period to the distribution generator 324.

The distribution generator 324 receives the position information of a plurality of elastic wave sources output from the position locator 323 as its input. The distribution generator 324 generates an elastic wave source distribution using the input position information of a plurality of elastic wave sources. The elastic wave source distribution represents a distribution in which the position of the elastic wave source is shown. More specifically, the elastic wave source distribution is a distribution showing points indicating the positions of the elastic wave sources on the virtual data representing the rail R which is a target of damaged region determination. The distribution generator 324 may generate an elastic wave source density distribution by expressing the position of the elastic wave source in a contour diagram using the elastic wave source distribution.

The determiner 325 determines the damaged region in the rail R based on the elastic wave source distribution generated by the distribution generator 324. Specifically, the determiner 325 determines an area where the density of elastic wave sources is equal to or higher than a threshold value as a damaged region.

The storage 33 stores the transmission data acquired by the acquirer 321. The storage 33 is configured using a storage device such as a magnetic hard disk device or a semiconductor storage device.

The display 34 displays the evaluation result according to the control of the determiner 325. The display 34 is an image display device such as a liquid crystal display or an organic electro luminescence (EL) display. The display 34 may be an interface for connecting the image display device to the determination apparatus 30. In this case, the display 34 generates a video signal for displaying the evaluation result, and outputs the video signal to the image display device connected to the display 34.

Figure 4:
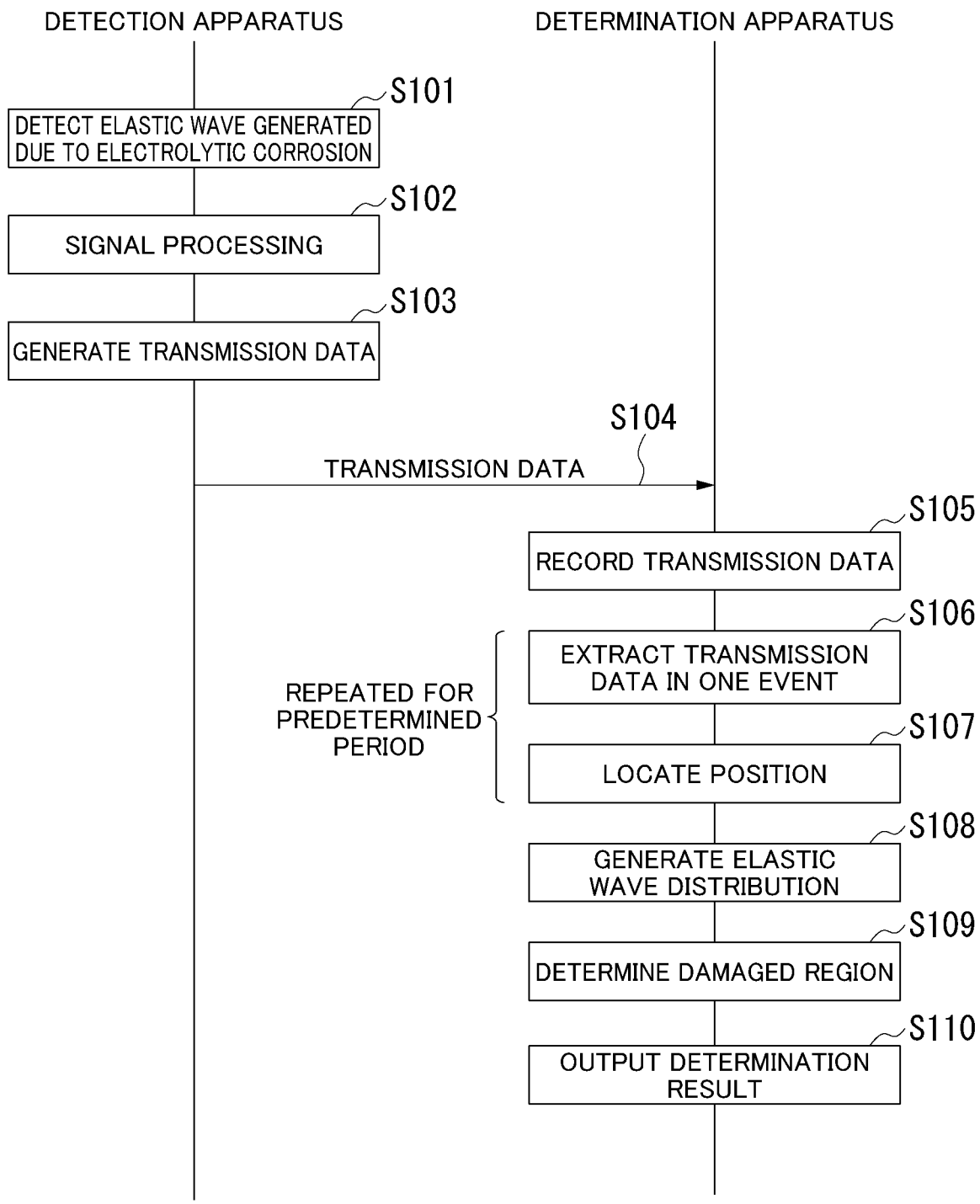
FIG. 4 is a sequence diagram showing a processing flow of the damaged region determination system according to the first embodiment.

FIG. 4 is a sequence diagram showing a processing flow of the damaged region determination system 100 according to the first embodiment. It is assumed that a current is flowing through the rail R at the start of the processing of FIG. 4.

Each sensor 10 detects elastic waves (step S101). For example, each sensor 10 detects elastic waves generated by electrolytic corrosion. Each sensor 10 converts the detected elastic wave into an electric signal and outputs it to the signal processor 20. The signal processor 20 performs signal processing on each electric signal output from each sensor 10 (step S102). Specifically, the signal processor 20 performs signal processing such as noise removal, determination of arrival time, and parameter extraction for each electric signal. The signal processor 20 executes the above-described signal processing every time an electric signal is obtained from the sensor 10.

The signal processor 20 generates transmission data for each sensor 10 using the data after signal processing (step S103). The signal processor 20 transmits the generated transmission data for each sensor 10 to the determination apparatus 30 via the wired cable 40 (step S104). Here, the signal processor 20 may transmit the transmission data to the determination apparatus 30 each time it is generated, or may collectively transmit the transmission data for a certain period to the determination apparatus 30 at the timing of generation.

The wired communicator 31 of the determination apparatus 30 receives the transmission data transmitted from the signal processor 20. The acquirer 321 acquires the transmission data received by the wired communicator 31. The acquirer 321 records the acquired transmission data in the storage 33 (step S105). The event extractor 322 extracts a plurality of pieces of transmission data in one event stored in the storage 33 (step S106). The event extractor 322 outputs the extracted transmission data in one event to the position locator 323.

The position locator 323 locates the position of the elastic wave source based on the sensor ID, the time information, and the sensor position information included in each of the plurality of pieces of transmission data in one event extracted by the event extractor 322 (step S107). The position locator 323 outputs the position locating result of the elastic wave source to the distribution generator 324. The event extractor 322 and the position locator 323 repeatedly execute the processes of steps S106 and S107 for a predetermined period.

The distribution generator 324 generates an elastic wave source distribution using the position information of the elastic wave source for a predetermined period (step S108). The distribution generator 324 outputs the generated elastic wave source distribution to the determiner 325. The determiner 325 determines the damaged region in the rail R based on the elastic wave source distribution generated by the distribution generator 324 (step S109). Specifically, the determiner 325 determines an area where the density of elastic wave sources is equal to or higher than the threshold value as a damaged region. As an example, the determiner 325 divides the elastic wave source distribution with a mesh and calculates the density of elastic wave sources for each divided area. Then, the determiner 325 may determine an area where the density of elastic wave sources is equal to or higher than the threshold value as a damaged region. When the elastic wave source distribution is represented by a contour diagram, an area having the density equal to or higher than a certain threshold value may be determined as a damaged region.

The determiner 325 outputs the determination result (step S110). For example, the determiner 325 may display the determination result on the display 34.

Figure 5:
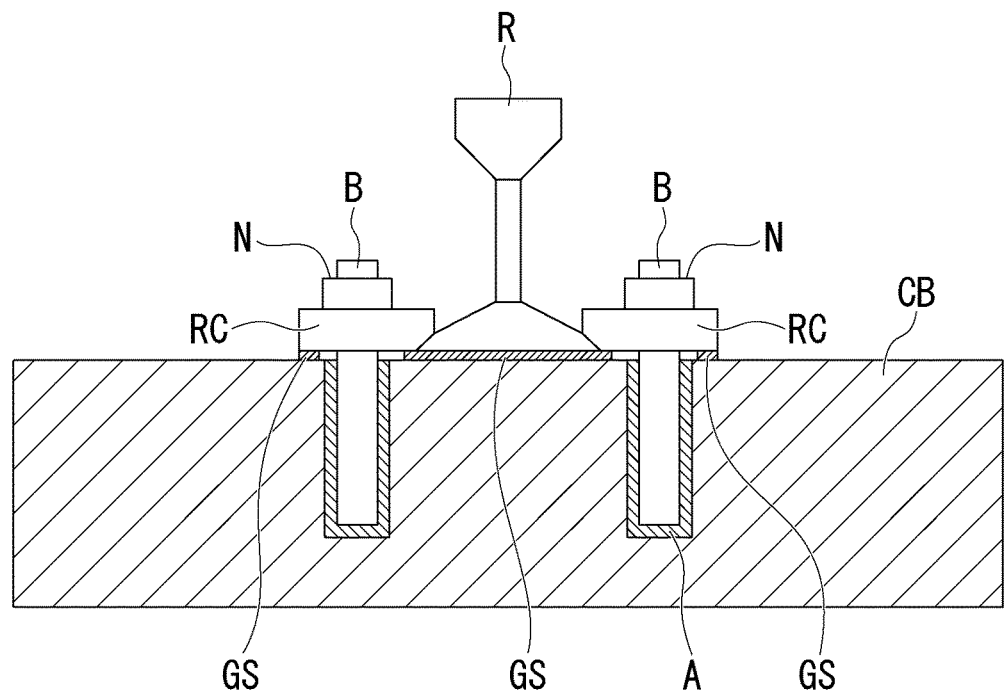
FIG. 5 is a diagram showing an example of an experimental model simulating an actual rail.

Next, using FIGS. 5 to 8, a method for evaluating the health of the rail R will be described in detail based on the results of a principle verification test using a rail simulation test body. Here, the rail simulation test body is an experimental model simulating the actual rail shown in FIG. 5. The experimental model shown in FIG. 5 is composed of a rail R, a concrete block CB, a rail clip RC, and a rubber sheet GS. The concrete block CB is a block used as a sleeper. The rail clip RC is a member for fixing the rail R to the concrete block CB, and is fixed by a bolt B and a nut N. The rubber sheet GS is a member for mechanically or electrically insulating the rail R and the rail clip RC from the concrete block CB. Adhesive A has flowed between the concrete block CB and the bolt B.

An inspection procedure in the embodiment is as follows. First, a plurality of sensors 10 is installed on the rail R to be inspected. Second, a predetermined current is applied to the rail R. Third, the sensor 10 detects elastic waves generated from damage (for example, an electrolytic corrosion portion). Fourth, the elastic wave detected by the sensor 10 is analyzed to locate the position of the elastic wave source. After that, the second to fourth steps are repeated to determine the damaged region.

Figure 6:
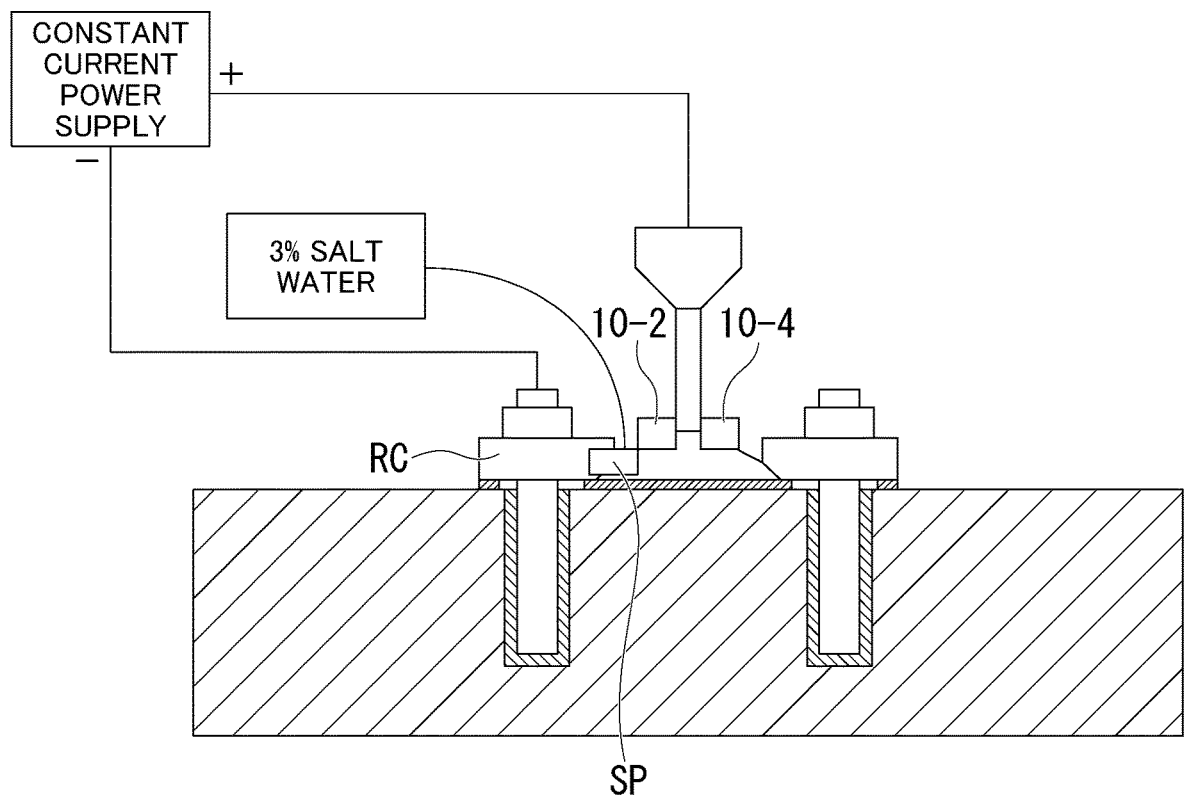
FIG. 6 is a diagram for explaining an overview of a principle verification test carried out in an experimental model.

Hereinafter, the overview of the principle verification test carried out by the experimental model will be described with reference to FIG. 6. In this test, four sensors 10-1 to 10-4 were placed on the rail R. FIG. 6 shows the sensors 10-2 and 10-4 installed in the front. The sensors 10-1 and 10-3 are installed at positions facing the sensors 10-2 and 10-4. However, the location and number of sensors are not limited to this, and may be any location and number(s) that can detect elastic waves generated by electrolytic corrosion of the rail clip RC, sleepers, or the like.

Subsequently, a DC current was applied between the rail R (positive electrode) and the rail clip RC (negative electrode) with a constant current power supply for a certain period of time. Here, the reason for using the DC current is to simulate the leakage current of the return circuit (generally the rail R) current flowing from the DC electric railway (including an inspection car) to the substation. It should be noted that an AC current may be applied assuming an AC electric railway. Further, in order to simulate the moist environment at the site (leakage point in the tunnel, and the like), a sponge SP soaked with salt water (concentration: 3%) was sandwiched between the rail R and the rail clip RC.

Figure 7:
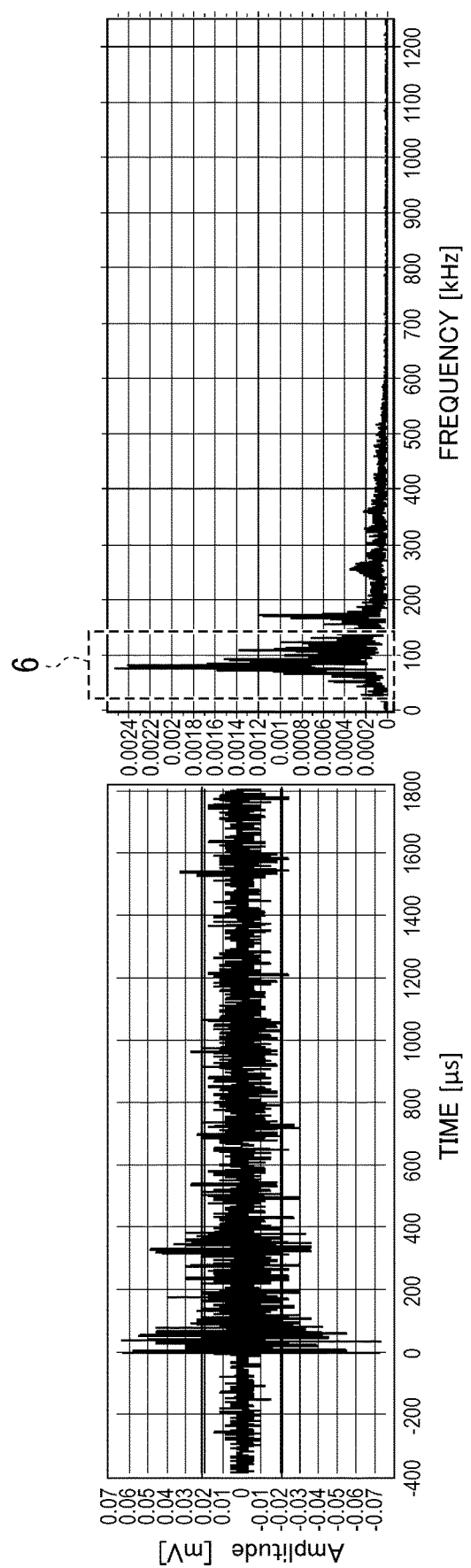
FIG. 7 is a diagram showing an example of a waveform of one elastic wave obtained by a principle verification test.

FIG. 7 is a diagram showing an example of the waveform of one elastic wave obtained by the above-mentioned principle verification test. The figure on the left side of FIG. 7 shows the waveform of an elastic wave with time on the horizontal axis and the amplitude on the vertical axis, and the figure on the right side of FIG. 7 shows the waveform of an elastic wave with frequency on the horizontal axis and amplitude on the vertical axis. As shown on the right side of FIG. 7, it can be seen that the elastic wave generated by electrolytic corrosion has a main resonance frequency (broken line 6 in FIG. 7) in a low frequency range (for example, less than 100 kHz).

Figure 8:
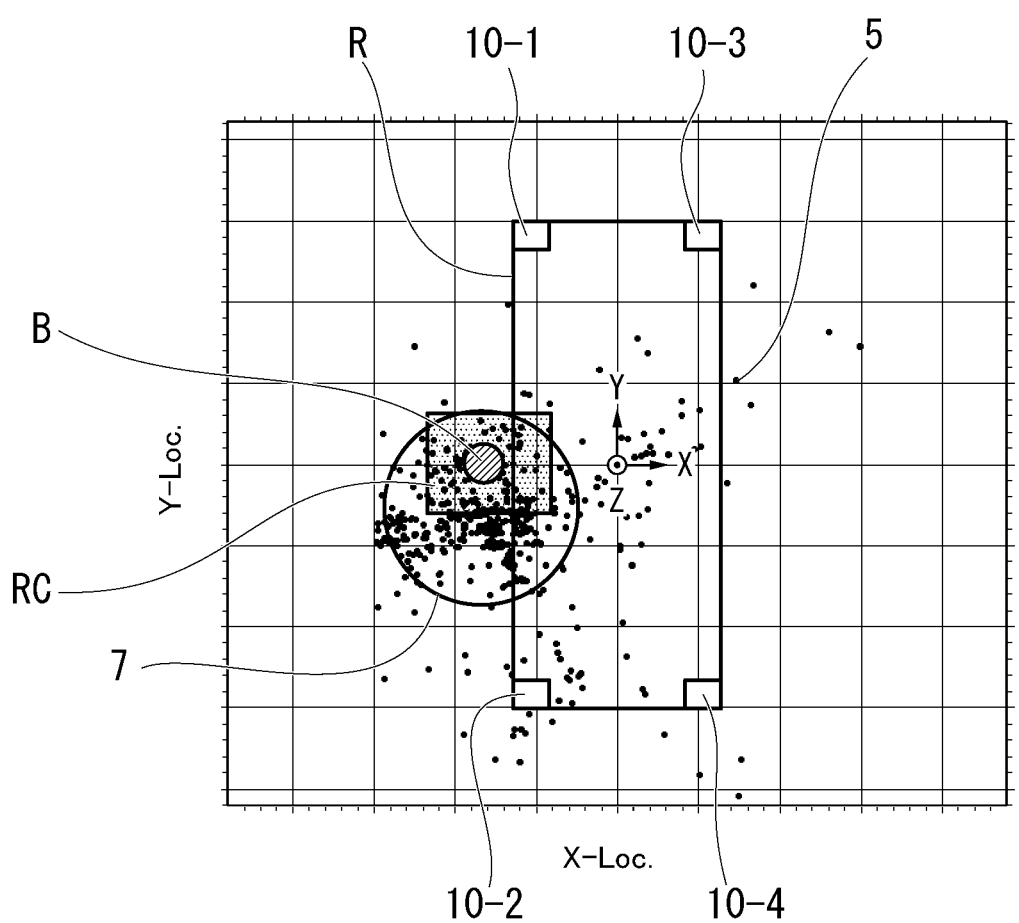
FIG. 8 is a diagram showing the results of analysis of elastic waves detected by each sensor.

FIG. 8 shows the results of analysis (for example, two-dimensional position locating, signal amplitude classification) of the elastic waves detected by each sensor 10. FIG. 8 shows an elastic wave source having an amplitude of 40 [dB] or more. In the example shown in FIG. 8, the positions of the plurality of electrolytic corrosion portions 5 are located, and the area indicated by the circle 7 is determined as the damaged region. As described above, it can be seen that the damaged region and the position of the electrolytic corrosion portion 5 can be estimated using the sensors 10-1 to 10-4 installed on the rail R.

Conventionally, as a technique for detecting breakage of the rail R, a method using a track circuit for train detection has been widely applied. On the other hand, in line with the trend of abolishing the use of track circuits, a method of not using track circuits, such as detecting ultrasonic waves propagating from the impact vibration at the time of breakage of the rail R, has also been proposed. This method works well for relatively large damage such as cracks. However, it is considered difficult to be applied to damage before crack growth, such as corrosion, for reasons such as detection sensitivity.

As a method for detecting damage before crack growth, for example, a method using ultrasonic waves disclosed in Patent Document 2 has been proposed. In the method of Patent Document 2, the presence or absence of damage can be known by irradiating the inside of the rail R with ultrasonic waves from an ultrasonic probe applied to the rail tread surface, which is the top surface of the rail R, and detecting the reflected echo from a damaged portion. In Patent Document 3, a method has been proposed in which a magnetic sensor installed at the bottom of the rail R is used to measure a leakage current at an inspection point to determine the state of electrolytic corrosion of the rail R.

However, the method disclosed in Patent Document 2 is not easy to apply to a place where ultrasonic waves are difficult to reach, such as the bottom end of the rail R. Specifically, it is not easy to apply to the detection of electrolytic corrosion generated between the rail R and the rail clip. On the other hand, it is presumed that the method disclosed in Patent Document 3 can detect electrolytic corrosion generated between the rail R and the rail clip. However, in order to specify the position of electrolytic corrosion damage, a magnetic sensor must be arranged for each rail clip, which is not an easy operation.

On the other hand, the damaged region determination system 100 according to the first embodiment includes the plurality of sensors 10 for detecting elastic waves generated in the rail R on which the railway vehicle RS travels, the position locator 323 that locates the positions of the sources of the plurality of elastic waves based on the plurality of elastic waves detected by each of the plurality of sensors 10, and the determiner 325 that determines a damaged region in the rail R based on the positions of the sources the plurality of elastic waves. Therefore, it is possible to easily determine the damaged region in the rail R before a breakage occurs.

Further, the damaged region determination system 100 further includes the signal processor 20 that extracts the feature values of the plurality of elastic waves detected by each of the plurality of sensors 10. The position locator 323 derives the source distribution after locating the positions of the sources of the plurality of elastic waves based on the feature values of the elastic waves. The determiner 325 determines the damaged region on the rail R using the source distribution. In this way, since the distribution showing the positions of the elastic wave sources is used, the damaged region can be determined according to the number of elastic wave sources.

Further, in the damaged region determination system 100, the determiner 325 determines an area having a density equal to or higher than the threshold value in the source distribution as a damaged region. The area where the density of elastic wave sources is equal to or higher than the threshold value is the area where more elastic waves are generated. Elastic waves are waves emitted from damaged portions during deformation, breakage, or electrochemical reaction of materials. The more elastic wave sources the area has, the more likely it is that damage has occurred. As described above, in the damaged region determination system 100, the damaged region can be easily determined using the source distribution.

Second Embodiment

In the first embodiment, the signal processor and the determination apparatus are connected by wire. In the second embodiment, a configuration in which the signal processor and the determination apparatus are wirelessly connected will be described.

Figure 9:
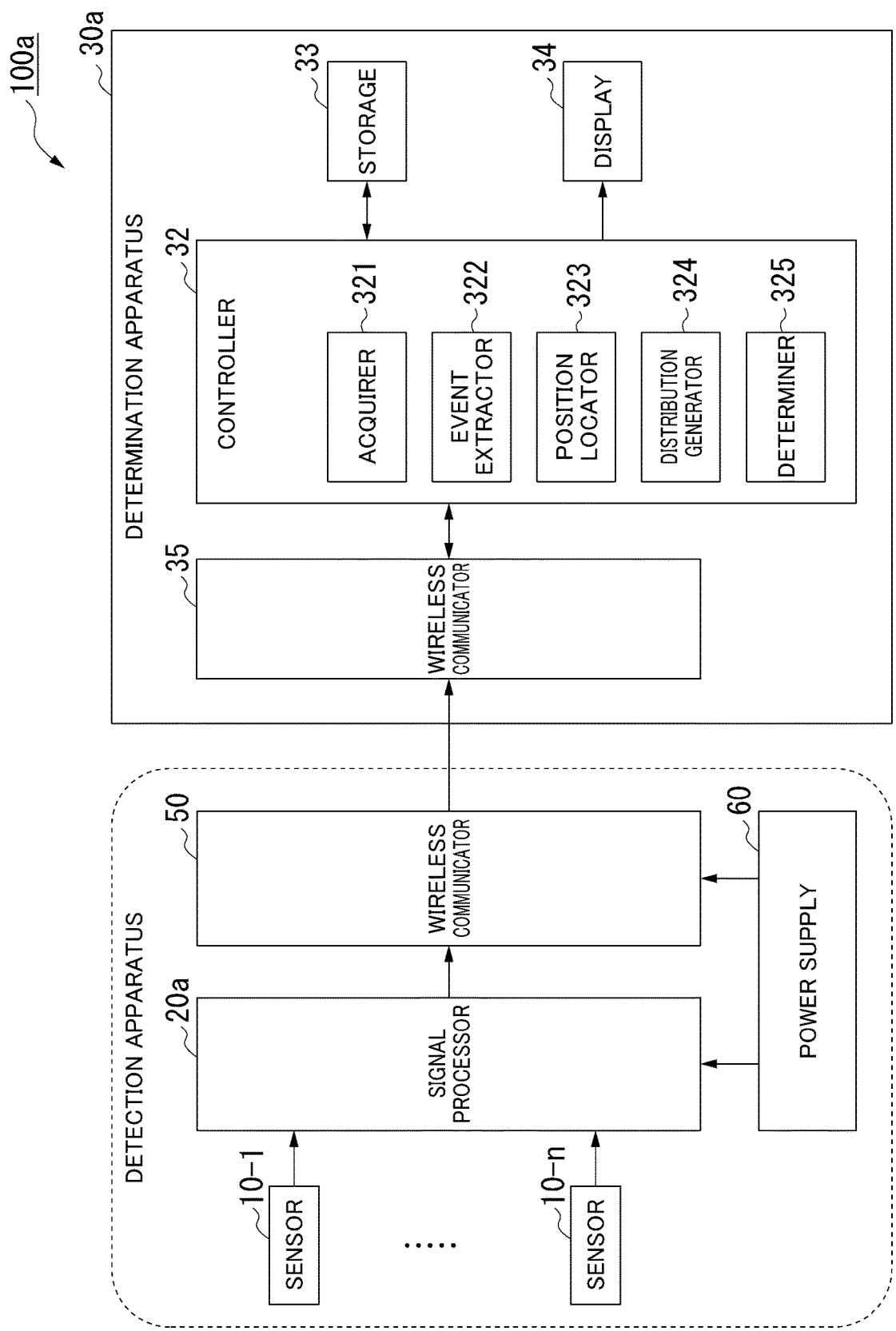
FIG. 9 is a diagram showing a configuration of a damaged region determination system according to a second embodiment.

FIG. 9 is a diagram showing the configuration of a damaged region determination system 100a according to the second embodiment. The damaged region determination system 100a includes a plurality of sensors 10-1 to 10-n, a signal processor 20a, a wireless communicator 50, a power supply 60, and a determination apparatus 30a. In the second embodiment, the sensor 10, the signal processor 20a, the wireless communicator 50, and the power supply 60 are configured as a detection device for detecting elastic waves generated in the rail R. Hereinafter, the differences from the first embodiment will be described.

The signal processor 20a outputs the data obtained by the signal processing to the wireless communicator 50 as transmission data.

The wireless communicator 50 transmits the transmission data output from the signal processor 20a to the determination apparatus 30a at a predetermined timing. The wireless communicator 50 is one aspect of a first wireless communicator.

The power supply 60 supplies power to the signal processor 20a and the wireless communicator 50. The power supply 60 is preferably an independent power source. The power supply 60 is a device that uses a primary battery, charging of a secondary battery based on the return current, or an energy harvester typified by a vibration-powered generator, for example.

(Vibration-Powered Generator)

The power supply 60 may be installed at any position where power can be supplied to the signal processor 20a and the wireless communicator 50. When the power supply 60 is installed on the rail R or an object in contact with the rail R, it is preferable in that the battery replacement can be eliminated using a vibration-powered generator that generates electricity using the vertical vibration of the rail R as the power supply 60, the wiring can be completed on the bogie, and the installation cost can be reduced. By configuring the natural frequency of the movable element of the vibration-powered generator to fall within the range of ±10% of the natural vibration frequency at the place where it is installed, a larger amount of electricity can be generated. In particular, it is desirable that the natural frequency of the movable element of the vibration-powered generator is set near the primary bending natural frequency of the installation location.

The determination apparatus 30a includes a wireless communicator 35, a controller 32, a storage 33, and a display 34. The determination apparatus 30a is different from the configuration of the first embodiment in that the wireless communicator 35 is provided in place of the wired communicator 31. The other configuration of the determination apparatus 30a is the same as the configuration of the determination apparatus 30 of the first embodiment.

The wireless communicator 35 wirelessly receives the transmission data transmitted from the wireless communicator 50. The wireless communicator 35 is one aspect of a second wireless communicator.

The processing of the damaged region determination system 100a of the second embodiment is the same as that of the first embodiment except that the transmission data is wirelessly transmitted from the detection device to the determination apparatus 30a instead of by wire.

The damaged region determination system 100a configured as described above includes the wireless communicator 50 that wirelessly transmits the transmission data including the data of the feature value of the elastic wave, the power supply 60 that supplies power to at least the wireless communicator 50, and the wireless communicator 35 that receives the transmission data transmitted from the wireless communicator 50. As a result, the detection device including the wireless communicator 50 can operate with the electric power supplied from the power supply 60. Furthermore, by making it wireless, it is possible to reduce the work cost of cable laying and management.

Further, in the damaged region determination system 100a, the determination apparatus 30a including at least the wireless communicator 35, the position locator 323, and the determiner 325 is installed in the railway vehicle RS. As a result, at least one railway vehicle RS (for example, a commercial vehicle or an inspection car) on which the determination apparatus 30a is mounted may be driven and data may be collected from the detection device, so that the data collection efficiency can be improved.

Further, in the damaged region determination system 100a, an independent power source such as a primary battery, charging of a secondary battery based on the return current, or an energy harvester typified by a vibration-powered generator is used as the power supply 60. This makes it possible to easily transmit transmission data even in a place where the power supply is not nearby.

(Modified Example of Damaged Region Determination System 100a of Second Embodiment)

Figure 10:
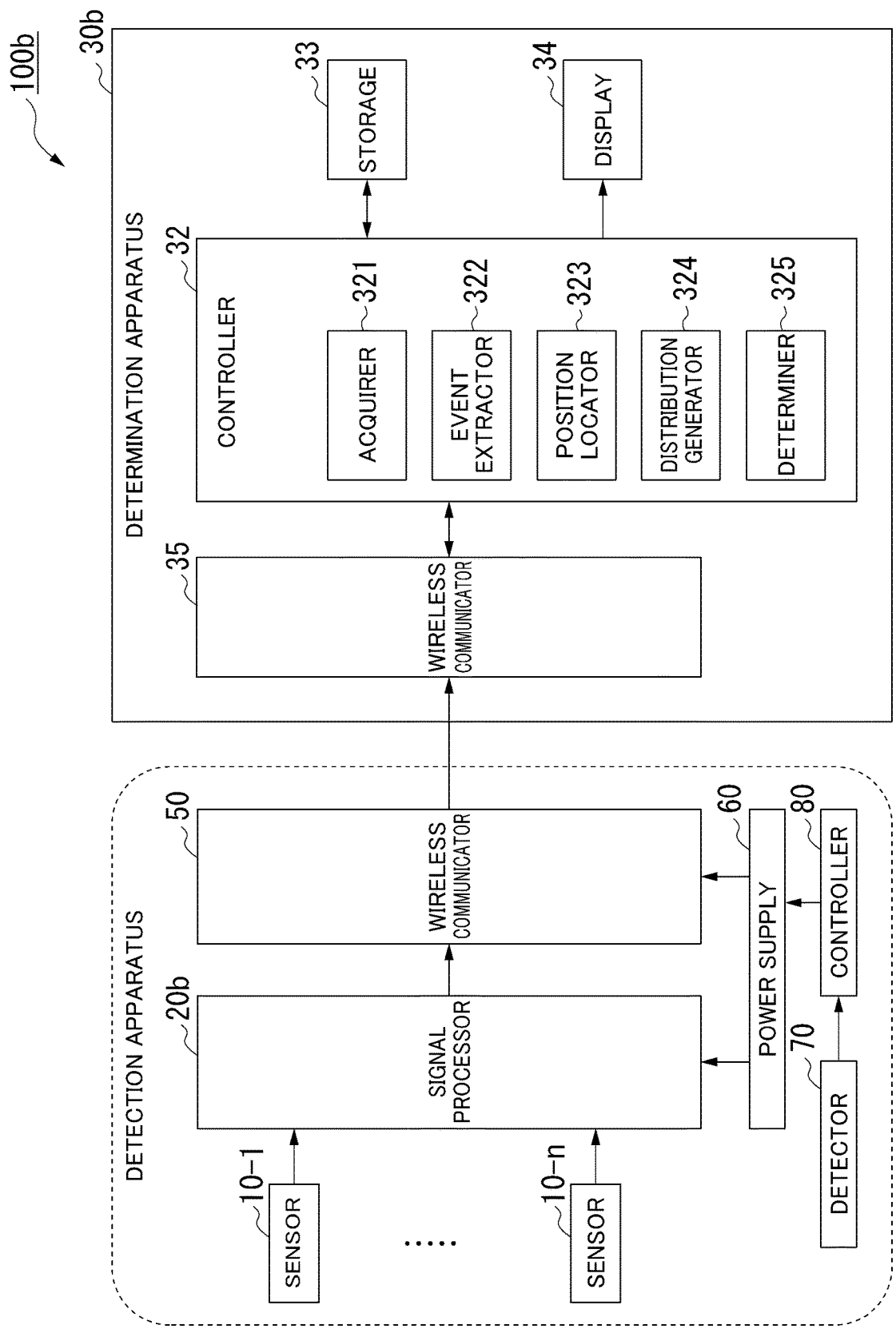
FIG. 10 is a diagram showing a configuration of a damaged region determination system in a modified example.

The damaged region determination system 100a may be configured to have a wake-up function that enables intermittent operation. FIG. 10 shows a configuration having a wake-up function that enables intermittent operation. FIG. 10 is a diagram showing the configuration of a damaged region determination system 100b of the modified example. The damaged region determination system 100b includes a plurality of sensors 10-1 to 10-n, a signal processor 20a, a wireless communicator 50, a power supply 60, a detector 70, a controller 80, and a determination apparatus 30b. The sensor 10, the signal processor 20b, the wireless communicator 50, the power supply 60, the detector 70, and the controller 80 are configured as a detection device for detecting elastic waves generated in the rail R. The difference from the second embodiment is that the signal processor 20b and the wireless communicator 50 in the detection device are in a sleep state before the start of processing, and the detector 70 and the controller 80 are newly provided.

The detector 70 detects changes in the environment. For example, the detector 70 is an accelerometer. A change in the environment means that the acceleration has changed by a predetermined value or more. The detector 70 monitors the traveling vibration of the railway vehicle RS, and notifies the controller 80 that the environment has changed when an acceleration of a predetermined value or more is detected.

When the detector 70 detects a change in the environment, the controller 80 activates a functional unit that is in the sleep state. For example, the controller 80 activates the signal processor 20b and the wireless communicator 50 in the sleep state by controlling the power supply 60 to supply power to the signal processor 20b and the wireless communicator 50. One of the signal processor 20b and the wireless communicator 50 may be in the sleep state.

With such a configuration, the signal processor 20b and the wireless communicator 50 do not need to be always activated, and power consumption can be suppressed.

When a vibration-powered generator is used as the power supply 60, the controller 80 activates the functional unit in the sleep state when the output signal of the power source from the vibration-powered generator is obtained. In this case, the damaged region determination system 100b does not have to include the detector 70.

With such a configuration, it is not necessary to provide the above-mentioned detector 70. Therefore, the cost can be reduced as compared with the configuration including the detector 70.

Third Embodiment

In the first and second embodiments, a configuration using all elastic waves detected by the sensors has been described. However, in order to actually operate the system in the field, it is necessary to take measures against various disturbances. For example, elastic waves detected by sensors include elastic wave generated by electrolytic corrosion (hereinafter referred to as "electrolytic corrosion elastic wave") and elastic waves caused by natural corrosion (hereinafter referred to as "natural corrosion elastic wave"). When working in a field where natural corrosion occurs, there is a high possibility that electrolytic corrosion elastic waves and natural corrosion elastic waves coexist. It is necessary to separate these elastic waves in order to suppress the deterioration of the determination accuracy of the damaged region caused by electrolytic corrosion. Therefore, in the third embodiment, a configuration for removing natural corrosion elastic waves from the elastic waves detected by the sensors will be described.

Figure 11:
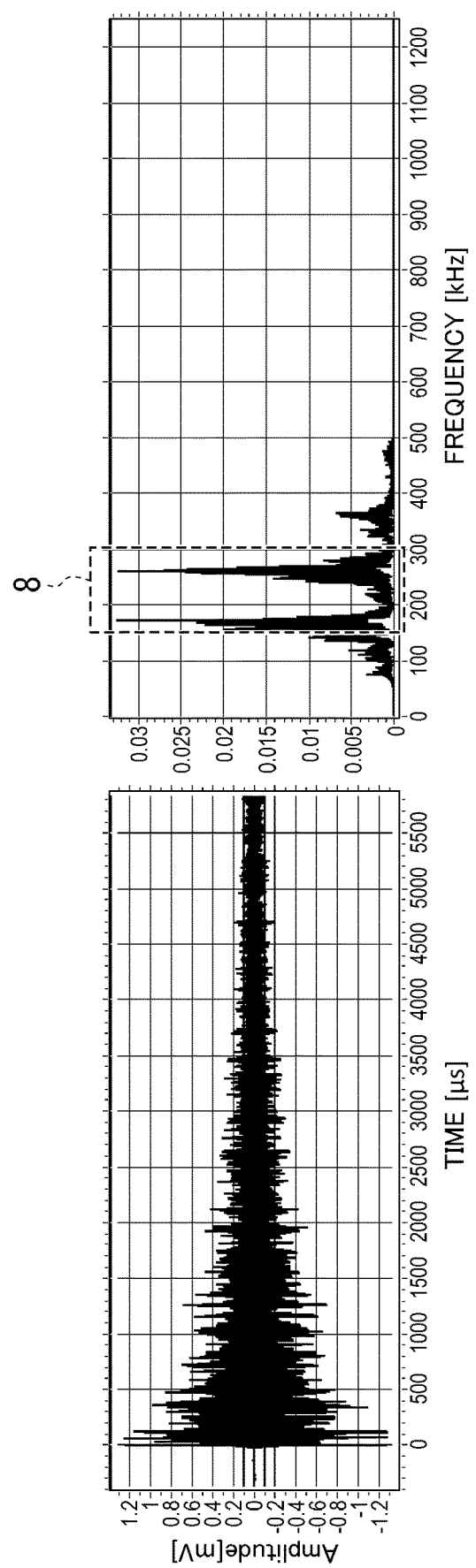
FIG. 11 is a diagram showing an example of a waveform of an elastic wave obtained in the environment shown in FIG. 6 when no current is applied.

FIG. 11 is a diagram showing an example of the waveform of an elastic wave obtained in the environment shown in FIG. 6 when no current is applied. The figure shown on the left side of FIG. 11 shows the waveform of an elastic wave with time on the horizontal axis and the amplitude on the vertical axis, and the figure shown on the right side of FIG. 11 shows the waveform of an elastic wave with frequency on the horizontal axis and the amplitude on the vertical axis. The elastic wave shown in FIG. 11 is a natural corrosion elastic wave generated in a moist environment and is different from the electrolytic corrosion elastic wave. As shown on the right side of FIG. 11, it can be seen that the natural corrosion elastic wave has a main resonance frequency (broken line 8 in FIG. 11) in a high frequency range (for example, 100 kHz or more). As described above, the main resonance frequency is different between the electrolytic corrosion elastic wave and the natural corrosion elastic wave. Therefore, by checking the frequency component of the elastic wave obtained by the sensor 10, the electrolytic corrosion elastic wave and the natural corrosion elastic wave can be separated.

Figure 12:
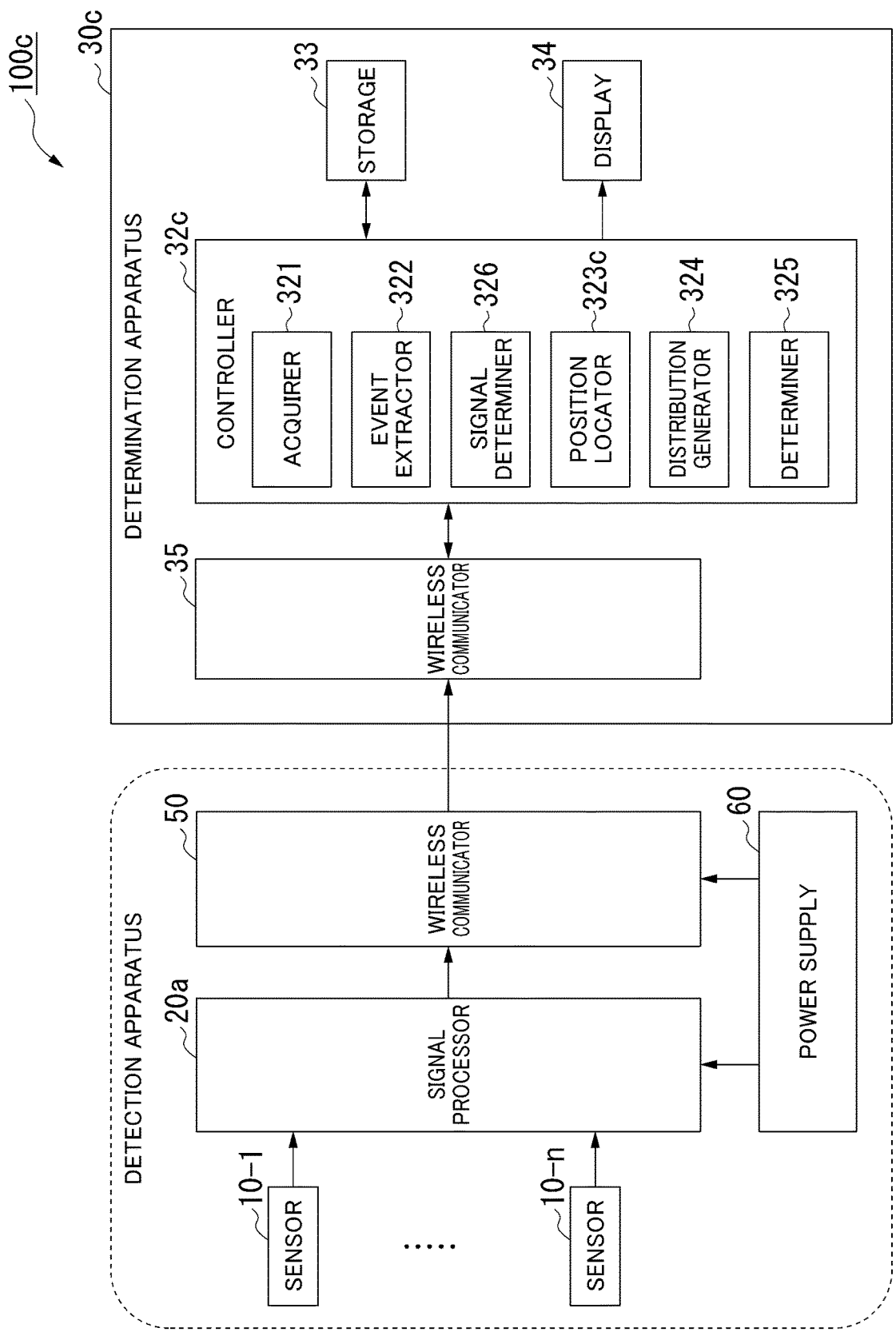
FIG. 12 is a diagram showing a configuration of a damaged region determination system according to a third embodiment.

FIG. 12 is a diagram showing the configuration of a damaged region determination system 100c according to the third embodiment. The damaged region determination system 100c includes a plurality of sensors 10-1 to 10-n, a signal processor 20a, a wireless communicator 50, a power supply 60, and a determination apparatus 30c. The configuration other than the determination apparatus 30c is the same as that of the second embodiment.

The determination apparatus 30c includes a wireless communicator 35, a controller 32c, a storage 33, and a display 34. The controller 32c controls the entire determination apparatus 30c. The controller 32c is configured using a processor such as a CPU and a memory. By executing the program, the controller 32c functions as an acquirer 321, an event extractor 322, a signal determiner 326, a position locator 323c, a distribution generator 324, and a determiner 325.

Some or all of the functional units of the acquirer 321, the event extractor 322, the signal determiner 326, the position locator 323c, the distribution generator 324, and the determiner 325 may be realized by hardware such as an ASIC, a PLD, and an FPGA or may be realized by the cooperation of software and hardware. The program may be recorded on a computer-readable recording medium. The computer-readable recording medium may be, for example, a portable medium such as a flexible disk, a magneto-optical disk, a ROM or a CD-ROM, or a non-temporary storage medium such as a storage device such as a hard disk built into a computer system. The program may be transmitted over a telecommunication line.

The functions of the acquirer 321, the event extractor 322, the signal determiner 326, the position locator 323c, the distribution generator 324, and the determiner 325 need not have been installed in the determination apparatus 30c in advance, and may be realized by installing an additional application program in the determination apparatus 30c.

The controller 32c is different in configuration from the controller 32 in that it includes a position locator 323c instead of the position locator 323 and a signal determiner 326 is newly provided. The differences will be described below.

The signal determiner 326 determines whether or not the main resonance frequency is within a predetermined range for each elastic wave detected by each of the plurality of sensors 10. For example, the signal determiner 326 determines whether or not the main resonance frequency is less than the low frequency range (for example, 100 kHz) for each elastic wave detected by the sensor 10.

The position locator 323c locates the position of the elastic wave source using the elastic wave determined by the signal determiner 326 that the main resonance frequency is within the predetermined range. The elastic wave determined to have the main resonance frequency within the predetermined range is an electrolytic corrosion elastic wave as described above. In this way, the position locator 323c locates the position of the elastic wave source using the electrolytic corrosion elastic wave.

The damaged region determination system 100c configured as described above includes the signal determiner 326 determines whether or not the main resonance frequency is within the predetermined range for each elastic wave detected by each of the plurality of sensors 10. Then, the position locator 323c locates the position of the source using the elastic wave determined by the signal determiner 326 that the main resonance frequency is within the predetermined range. As a result, in the damaged region determination system 100c, the electrolytic corrosion elastic wave and the natural corrosion elastic wave can be used separately. Therefore, it is possible to accurately determine the damaged region caused by electrolytic corrosion.

(Modified Example of Damaged Region Determination System 100c of Third Embodiment)

In the above-described embodiment, a configuration is shown in which an electrolytic corrosion elastic wave and a natural corrosion elastic wave are separated to determine a damaged region caused by electrolytic corrosion. The determination apparatus 30c may be configured to determine the damaged region caused by natural corrosion. In this case, the position locator 323c may use the elastic wave determined by the signal determiner 326 that the main resonance frequency is not within a predetermined range to locate the position of the elastic wave source. Then, the determiner 325 determines the damaged region based on the position of the elastic wave source located by the position locator 323c. As described above, the position of the elastic wave source located by the position locator 323c is the source of the elastic wave caused by natural corrosion. Therefore, it is possible to accurately determine the damaged region caused by natural corrosion.

The determination apparatus 30c may be configured to determine both the damaged region caused by electrolytic corrosion and the damaged region caused by natural corrosion. When configured in this way, as a first step, the position locator 323c locates the position of the elastic wave source using the elastic wave determined by the signal determiner 326 that the main resonance frequency is within the predetermined range. Further, as a second step, the position locator 323c locates the position of the elastic wave source using the elastic wave determined by the signal determiner 326 that the main resonance frequency is not within the predetermined range. Then, the determiner 325 determines both the damaged region caused by electrolytic corrosion and the damaged region caused by natural corrosion based on the positions of the elastic wave sources separately located by the position locator 323c. The determiner 325 displays the determination results separately on the display 34.

Fourth Embodiment

Assuming the induction of electrolytic corrosion by the return current of the railway vehicle, if the railway traveling position and the source of the electrolytic corrosion elastic wave are within a predetermined distance, it may not possible for the sensor to detect disturbance on a train traveling simultaneously to accurately read the sensor arrival time of the electrolytic corrosion elastic wave, which may lead to deterioration of the accuracy of position locating. On the other hand, when the frequency band of the disturbance on a train traveling is far from the main band of the electrolytic corrosion elastic wave, it is considered that the disturbance can be sufficiently removed by frequency filtering. However, this is difficult when they are close to each other. One of the effective means in such a case is to remove disturbance in the time domain. Specifically, by selecting sensors that are separated from the position of the railway vehicle acquired at a certain time by a predetermined distance or more, it can be expected to avoid mixing of disturbance. Therefore, in the fourth embodiment, a configuration for selecting sensors to be used for position locating according to the position of the railway vehicle will be described.

Figure 13:
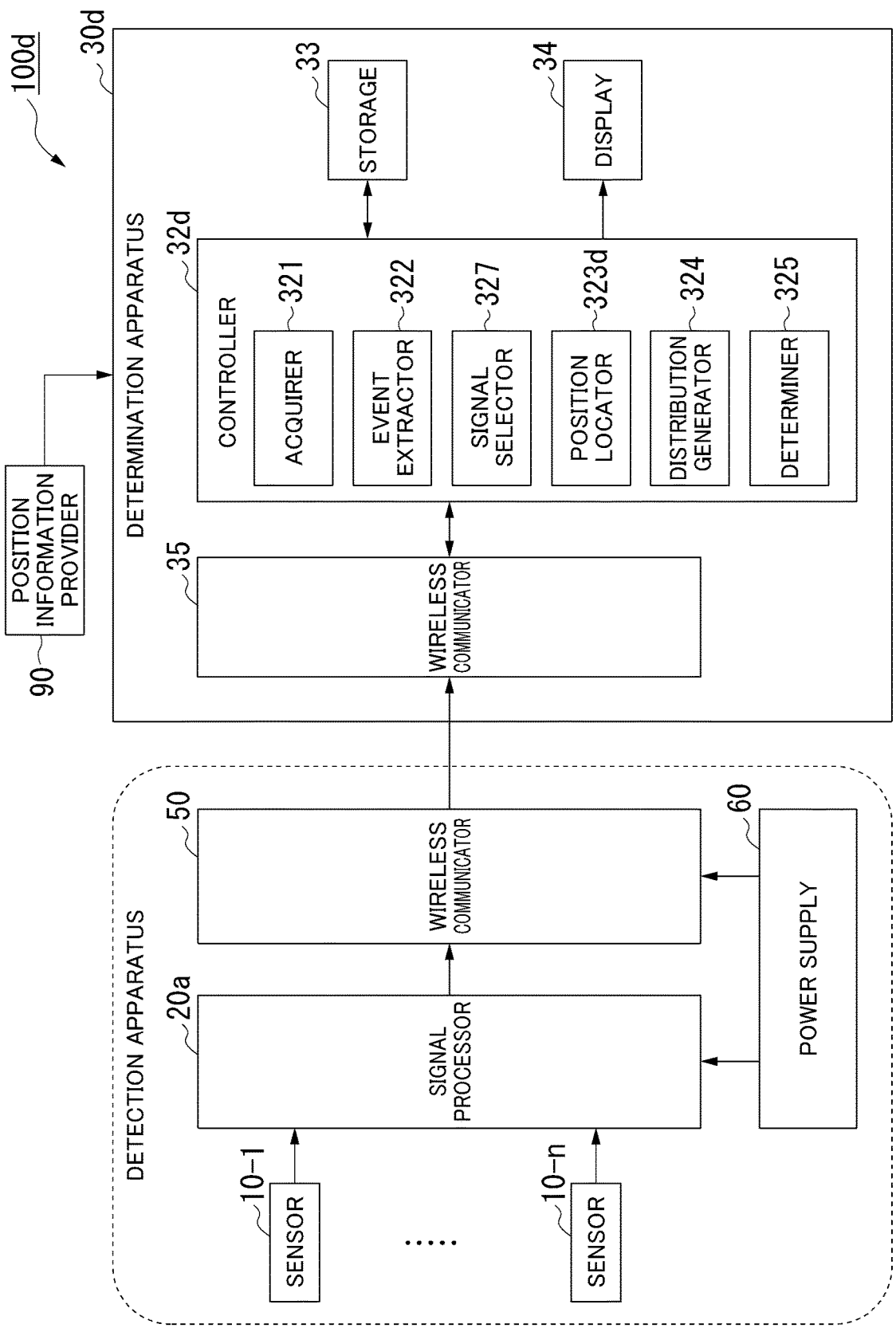
FIG. 13 is a diagram showing a configuration of a damaged region determination system according to a fourth embodiment.

FIG. 13 is a diagram showing the configuration of a damaged region determination system 100d according to the fourth embodiment. The damaged region determination system 100d includes a plurality of sensors 10-1 to 10-n, a signal processor 20a, a wireless communicator 50, a power supply 60, a determination apparatus 30d, and a position information provider 90. The configuration other than the determination apparatus 30d and the position information provider 90 is the same as that of the second embodiment.

The position information provider 90 acquires the position information of the railway vehicle RS and provides the acquired position information to the determination apparatus 30d. The position information provider 90 may acquire position information by, for example, global positioning system (GPS). The position information provider 90 may acquire the position information of the railway vehicle RS by another method as long as the position information of the railway vehicle RS can be acquired. For example, the position information provider 90 may refer to train detection information of a track circuit or communication based train control (CBTC).

The determination apparatus 30d includes a wireless communicator 35, a controller 32d, a storage 33, and a display 34. The controller 32d controls the entire determination apparatus 30d. The controller 32d is configured using a processor such as a CPU and a memory. By executing the program, the controller 32d functions as an acquirer 321, an event extractor 322, a signal selector 327, a position locator 323d, a distribution generator 324, and a determiner 325.

Some or all of the functional units of the acquirer 321, the event extractor 322, the signal selector 327, the position locator 323d, the distribution generator 324, and the determiner 325 may be realized by hardware such as an ASIC, a PLD, and an FPGA or may be realized by the cooperation of software and hardware. The program may be recorded on a computer-readable recording medium. The computer-readable recording medium may be, for example, a portable medium such as a flexible disk, a magneto-optical disk, a ROM or a CD-ROM, or a non-temporary storage medium such as a storage device such as a hard disk built into a computer system. The program may be transmitted over a telecommunication line.

The functions of the acquirer 321, the event extractor 322, the signal selector 327, the position locator 323d, the distribution generator 324, and the determiner 325 need not have been installed in the determination apparatus 30d in advance, and may be realized by installing an additional application program in the determination apparatus 30d.

The controller 32d is different from the controller 32 in that it includes a position locator 323d instead of the position locator 323 and a signal selector 327 is newly provided. The differences will be described below.

The signal selector 327 selects the sensor 10 whose distance from the railway vehicle RS is a predetermined value or more from the plurality of sensors 10 based on the position information of the railway vehicle RS provided from the position information provider 90.

Figure 14:
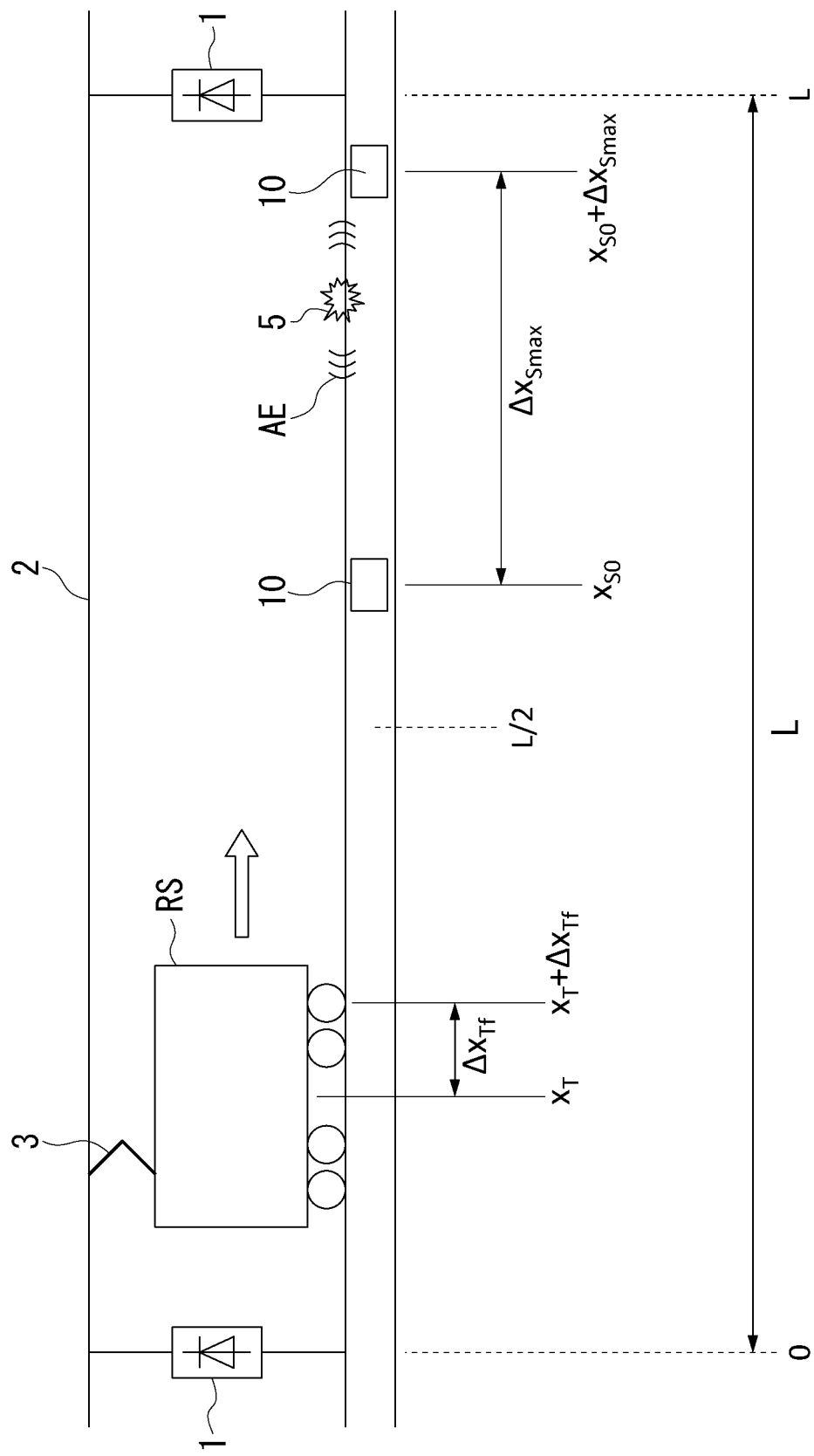
FIG. 14 is a diagram for explaining specific processing of a signal selector in the fourth embodiment.
Figure 15:
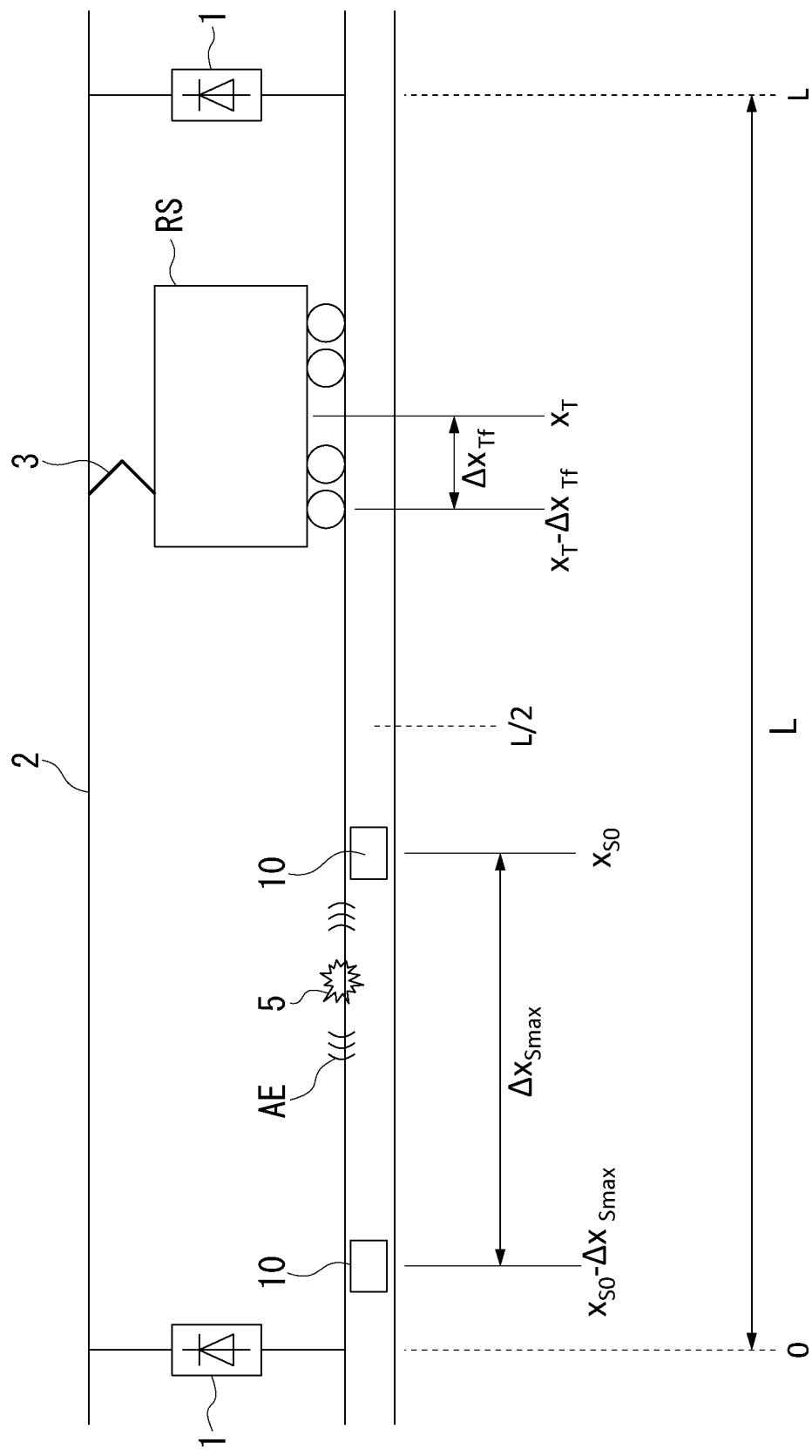
FIG. 15 is a diagram for explaining specific processing of the signal selector in the fourth embodiment.

A method of selecting the sensor 10 by the signal selector 327 will be described. FIGS. 14 and 15 are diagrams for explaining the specific processing of the signal selector 327. In FIGS. 14 and 15, the distance between the substation 1 at a certain point and the substation 1 at another point is L, the position of the railway vehicle RS is $X_T$, the position of a certain sensor 10 is $X_{s0}$, and the distance between the sensor 10 and another sensor 10 is $\Delta X_{smax}$. The position of the railway vehicle RS may be the position of the center of the railway vehicle RS. In this case, the distance between the position of the railway vehicle RS and the leading wheel is $\Delta X_{Tf}$, and the distance between the position of the railway vehicle RS and the tail wheel is $\Delta X_{Tr}$.

FIG. 14 shows a state in which the position $X_T$ of the railway vehicle RS has not reached the position of the point L/2. In this case, the signal selector 327 selects the sensor 10 satisfying the following equation (1) from the plurality of sensors 10.

$$X_{s0} > X_T + \Delta X_{Tf} + \Delta X_{smax} \qquad \text{Equation(1)}$$

FIG. 15 shows a state in which the position $X_T$ of the railway vehicle RS has passed the position of the point L/2. In this case, the signal selector 327 selects the sensor 10 satisfying the following equation (2) from the plurality of sensors 10.

$$X_{s0} < X_T - \Delta X_{Tr} - \Delta X_{smax} \qquad \text{Equation(2)}$$

The position locator 323d locates the position of the elastic wave source based on the elastic wave detected by the sensor 10 selected by the signal selector 327.

The damaged region determination system 100d configured as described above includes the position information provider 90 that provides the position information of the railway vehicle RS, and the signal selector 327 that selects a sensor 10 whose distance from the railway vehicle RS is a predetermined value or more from the plurality of sensors 10 based on the position information of the railway vehicle RS provided by the position information provider 90. The position locator 323d locates the position of the elastic wave source based on the elastic wave detected by the selected sensor 10. In this way, by selecting the sensor 10 whose distance from the railway vehicle RS is the predetermined value or more from the plurality of sensors 10, the influence of the traveling disturbance can be suppressed and the position can be located. Therefore, it is possible to suppress deterioration in the accuracy of position locating.

(Modification Example Common to any of First to Fourth Embodiments)

In each of the above-described embodiments, the case where the determination target of the damaged region is a rail has been described as an example. The determination target of the damaged region may be an object related to a railway, and does not have to be limited to a rail. For example, the object related to the railway which is the determination target of the damaged region may be an overhead line. When the wireless system is used as in the second to fourth embodiments, it is possible to determine the damaged region of the overhead line in addition to the rail. Similarly to rails, elastic waves are generated by corrosion in overhead lines. The processing is the same as that of the second to fourth embodiments, except that the installation target of the sensor 10 is replaced with the overhead line.

In the third and fourth embodiments, the detection device and the determination apparatus may be configured to be connected by wire. The third and fourth embodiments may be modified in the same manner as the second embodiment.

In the first to fourth embodiments, the return current flowing between the railway vehicle RS and the substation has been described as an example of the current flowing through the rail R, but if the current can be passed through the rail R, it may be a current given by another method. For example, as shown in FIG. 6, a constant current power supply may be used to pass a current through the rail R at any timing. With this method, the inspection can be performed at desired inspection timing.

Figure 16A:
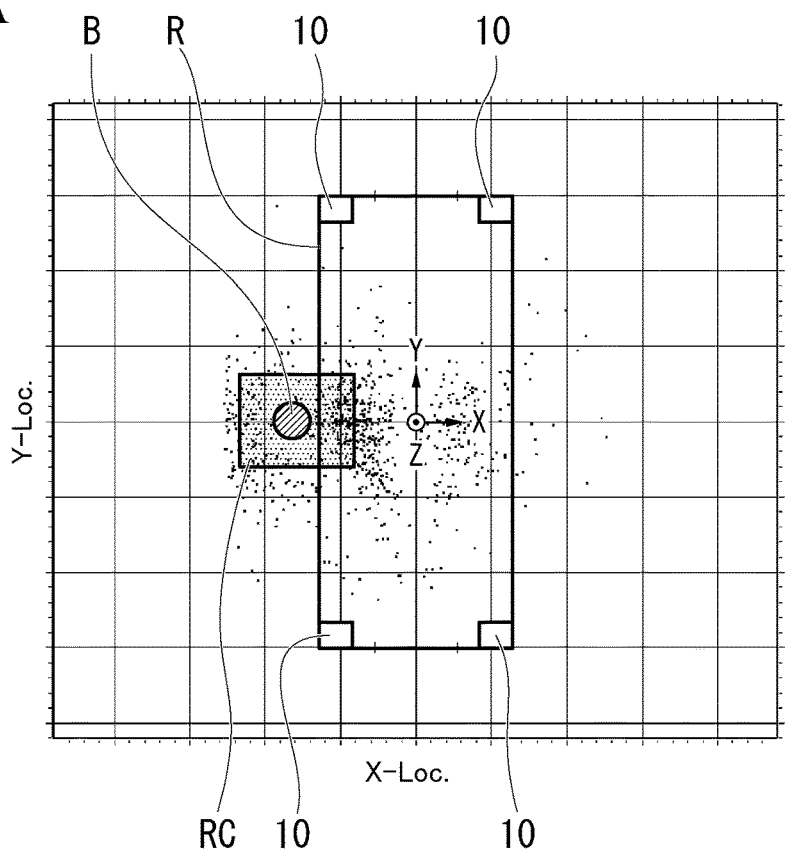
FIG. 16A is a diagram showing the result of detecting the electrolytic corrosion elastic wave using a plurality of low frequency sensors.
Figure 16B:
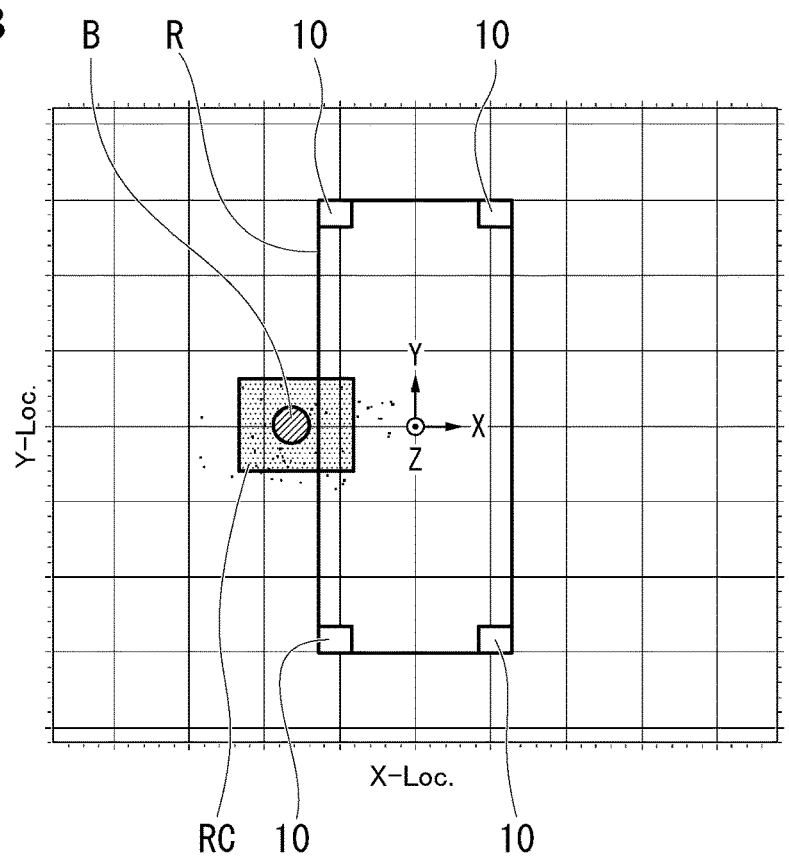
FIG. 16B is a diagram showing the result of detecting the electrolytic corrosion elastic wave using a plurality of high frequency sensors.

Some functions of the determination apparatus 30, 30a, 30b, and 30c may be provided in another housing. Taking the determination apparatus 30 in the first embodiment as an example, for example, the controller 32 of the determination apparatus 30 may be provided with the functions of the acquirer 321 and the determiner 325, and the functions of the event extractor 322, the position locator 323, and the distribution generator 324 may be provided in another housing. When configured in this way, the determiner 325 acquires the elastic wave source distribution from another housing, and determines the damaged region using the acquired elastic wave source distribution. In the first to fourth embodiments, a plurality of low frequency sensors 10 may be used as a plurality of sensors 10. A low frequency sensor 10 is, for example, sensor having a resonance frequency of 70 kHz. As described above, the electrolytic corrosion elastic wave is characterized in that it has a main resonance frequency in the low frequency range. Therefore, by matching the center frequency of the sensor 10 with the main resonance frequency of the electrolytic corrosion elastic wave, it is possible to separate the natural corrosion elastic wave and detect the electrolytic corrosion elastic wave with high sensitivity. Specifically, a low frequency sensor 10 (resonance frequency: 70 kHz) may be used as the sensor 10. FIG. 16A and FIG. 16B are a diagram showing the results of detecting electrolytic corrosion elastic waves using a plurality of low frequency sensors 10 and a plurality of high frequency sensors 10. FIG. 16A shows the result of detecting the electrolytic corrosion elastic wave using the plurality of low frequency sensors 10, and FIG. 16B shows the result of detecting the electrolytic corrosion elastic wave using the plurality of high frequency sensors 10. As shown in FIGS. 16A and 16B, when the plurality of low frequency sensors 10 are used, it can be seen that electrolytic corrosion elastic waves are detected with higher sensitivity than the plurality of high frequency sensor 10 (resonance frequency: 150 kHz).

The signal processor 20 may be provided in the determination apparatus 30, 30c, and 30d. The signal processor 20a may be provided in the determination apparatus 30a. The signal processor 20b may be provided in the determination apparatus 30b. When configured in this way, the signal processors 20, 20a, and 20b acquire the electric signal output from the sensor 10 directly from the sensor 10 or via a relay device (not shown).

The determiner 325 may operate as an output controller. The output controller controls the outputter and outputs the determination result. Here, the outputter includes a display 34, a communicator, and a printer. When the outputter is a communicator, the output controller controls the communicator and transmits the determination result to another device. When the outputter is a printer, the output controller controls the printer and prints the determination result. The determination apparatus 30, 30a, 30b, 30c, and 30d may include some or all of the display 34, the communicator, and the printer to perform the above-described operation.

According to at least one embodiment described above, the damaged region determination system includes a plurality of sensors that detects elastic waves generated in an object related to a railway (for example, a rail on which the railway vehicle RS travels) which is a determination target of a damaged region, a position locator that locates the positions of the sources of a plurality of elastic waves based on the plurality of elastic waves detected by each of the plurality of sensors, and a determiner that determines a damaged region in the object based on the positions of the sources of the plurality of elastic waves. Therefore, it is possible to easily determine the damaged region of the object related to the railway before a breakage occurs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A damaged region determination system, comprising:
a plurality of sensors configured to detect elastic waves generated in a target object related to a railway which is a determination target of a damaged region;
a position locator configured to locate positions of sources of a plurality of elastic waves based on the plurality of elastic waves detected by each of the plurality of sensors;
a determiner configured to determine the damaged region in the target object based on the positions of the sources of the plurality of elastic waves; and
a signal processor configured to extract feature values of the plurality of elastic waves detected by each of the plurality of sensors, wherein
the position locator locates the positions of the sources of the plurality of elastic waves based on the feature values of the elastic waves, and derives a source distribution representing the located positions of the sources of the plurality of elastic waves,
the determiner determines the damaged region in the target object using the source distribution, and
the determiner determines an area having a density equal to or higher than a threshold value in the source distribution as the damaged region.

2. The damaged region determination system according to claim 1, wherein
the plurality of sensors is installed at least on the target object or an object in contact with the target object.

3. The damaged region determination system according to claim 1, further comprising:
a first wireless communicator configured to transmit data of elastic wave feature values obtained from the plurality of elastic waves detected by each of the plurality of sensors wirelessly;
a power supply configured to supply power to at least the first wireless communicator; and
a second wireless communicator configured to receive the data of the elastic wave feature values transmitted from the first wireless communicator, wherein
the position locator locates the positions of the sources of the plurality of elastic waves using the data of the elastic wave feature values received by the second wireless communicator.

4. The damaged region determination system according to claim 3, wherein
the second wireless communicator, the position locator, and the determiner are installed in a railway vehicle.

5. The damaged region determination system according to claim 3, wherein
the power supply is an independent power supply.

6. The damaged region determination system according to claim 3, further comprising:
a detector configured to detect changes in an environment; and
a controller configured to activate at least the first wireless communicator when a change in the environment is detected by the detector.

7. The damaged region determination system according to claim 3, further comprising:
a controller configured to activate at least the first wireless communicator when the power supply is a vibration-powered generator and the vibration-powered generator operates.

8. The damaged region determination system according to claim 1, further comprising:
a signal determiner configured to determine whether or not a main resonance frequency is within a predetermined range for each of the elastic waves detected by each of the plurality of sensors, wherein
the position locator locates the position of the source using an elastic wave determined by the signal determiner to have a main resonance frequency within the predetermined range.

9. The damaged region determination system according to claim 1, further comprising:
a position information provider configured to provide position information of a railway vehicle; and
a signal selector configured to select a sensor whose distance from the railway vehicle is a predetermined value or more from the plurality of sensors based on the position information of the railway vehicle provided by the position information provider, wherein
the position locator locates the position of the source based on the elastic waves detected by the selected sensor.

10. The damaged region determination system according to claim 1, wherein
center frequencies of the plurality of sensors are substantially equal to the main resonance frequency of the elastic waves.

11. The damaged region determination system according to claim 1, wherein
the target object is a rail on which a railway vehicle travels.

12. A damaged region determination system, comprising:
a plurality of sensors configured to detect elastic waves generated in a target object related to a railway which is a determination target of a damaged region;
a position locator configured to locate positions of sources of a plurality of elastic waves based on the plurality of elastic waves detected by each of the plurality of sensors; and
a determiner configured to determine the damaged region in the target object based on the positions of the sources of the plurality of elastic waves, wherein
the elastic wave is a wave emitted when a current flowing through the target object leaks and electrolytic corrosion occurs.

13. The damaged region determination system according to claim 12, wherein
the current flowing through the target object is a return current flowing between a railway vehicle and a substation.

14. A damaged region determination method, comprising:
locating positions of sources of a plurality of elastic waves based on the plurality of elastic waves detected by each of a plurality of sensors that detects elastic waves generated in a target object related to a railway which is a determination target of a damaged region; and
determining the damaged region in the target object based on the located positions of the sources of the plurality of elastic waves, wherein the target object is a rail, the method further comprising:
applying a current to the rail;
locating the position of the source of the elastic wave emitted when the current flowing through the rail leaks and electrolytic corrosion occurs;
deriving a source distribution representing the located positions of the sources of the plurality of elastic waves; and
determining the damaged region in the rail using the source distribution.

* * * * *